(12) United States Patent
Emerson et al.

(10) Patent No.: US 12,562,956 B2
(45) Date of Patent: Feb. 24, 2026

(54) ALARM VIEWER ESTABLISHMENT OF CONNECTION-ORIENTED COMMUNICATION WITH A DISTRIBUTED CONTROL NODE OF A PROCESS AUTOMATION SYSTEM

(71) Applicant: Yokogawa Electric Corporation, Tokyo (JP)

(72) Inventors: David Emerson, Coppell, TX (US); Patrick Clay, Frisco, TX (US); Vien Nguyen, Frisco, TX (US); Hidenori Sawahara, Spring, TX (US)

(73) Assignee: Yokogawa Electric Corporation, Tokyo (JP)

( * ) Notice: Subject to any disclaimer, the term of this patent is extended or adjusted under 35 U.S.C. 154(b) by 475 days.

(21) Appl. No.: 18/090,282

(22) Filed: Dec. 28, 2022

(65) Prior Publication Data

US 2024/0223442 A1 Jul. 4, 2024

(51) Int. Cl.
H04L 41/0686 (2022.01)
H04L 41/069 (2022.01)
H04L 67/141 (2022.01)

(52) U.S. Cl.
CPC ........ H04L 41/0686 (2013.01); H04L 41/069 (2013.01); H04L 67/141 (2013.01)

(58) Field of Classification Search
CPC . H04L 41/0686; H04L 41/069; H04L 67/141; H04L 67/55
See application file for complete search history.

(56) References Cited

U.S. PATENT DOCUMENTS

| | | | |
|---|---|---|---|
| 6,205,362 | B1 | 3/2001 | Eidson |
| 7,551,072 | B2 | 6/2009 | Tambascio et al. |
| 10,410,493 | B2 | 9/2019 | Rischar et al. |
| | | (Continued) | |

FOREIGN PATENT DOCUMENTS

| | | |
|---|---|---|
| CN | 111416731 | 7/2020 |
| CN | 111508214 | 8/2020 |
| | (Continued) | |

OTHER PUBLICATIONS

International Search Report and Written Opinion issued for Application No. PCT/IB2023/06299, 8 pages, dated Mar. 19, 2024.

*Primary Examiner* — Schquita D Goodwin
(74) *Attorney, Agent, or Firm* — Gray Ice Higdon

(57) ABSTRACT

Implementations relate to receiving, from a distributed control node (DCN) that includes a corresponding active alarm engine, an alarm configuration transmission that includes a network addressable DCN identifier of the DCN and also includes a direct or indirect indication that the DCN is implementing alarm monitoring that is based on function block(s) of a process automation system. Implementations further relate to, in response to receiving the alarm configuration transmission and determining that no persistent connection-oriented communication session is established between an alarm viewer and the DCN indicated by the addressable DCN identifier of the alarm configuration transmission, causing the alarm viewer to establish a persistent connection-oriented communication session with the DCN using the addressable DCN identifier.

20 Claims, 9 Drawing Sheets

(56) References Cited

U.S. PATENT DOCUMENTS

| | | | |
|---|---|---|---|
| 11,650,892 B1 * | 5/2023 | Joyner | H04L 67/141 |
| | | | 714/25 |
| 2005/0125877 A1 | 6/2005 | Benjamin et al. | |
| 2012/0310381 A1 | 12/2012 | Karaffa et al. | |
| 2016/0065656 A1 | 3/2016 | Patin et al. | |
| 2018/0077109 A1 | 3/2018 | Hoeme et al. | |
| 2018/0109955 A1 | 4/2018 | Nixon et al. | |
| 2019/0102401 A1 * | 4/2019 | Neel | G06F 11/1471 |
| 2019/0355228 A1 | 11/2019 | Rischar et al. | |
| 2021/0051494 A1 * | 2/2021 | Anand | H04L 41/0654 |
| 2021/0064004 A1 * | 3/2021 | Kurokawa | G06F 21/85 |
| 2022/0011756 A1 | 1/2022 | Hoernicke et al. | |
| 2022/0086037 A1 * | 3/2022 | Géhberger | H04L 41/0654 |
| 2022/0303338 A1 | 9/2022 | Nguyen et al. | |
| 2022/0308542 A1 | 9/2022 | Clay et al. | |
| 2022/0308555 A1 | 9/2022 | Malm et al. | |
| 2022/0311700 A1 * | 9/2022 | Wang | H04L 45/24 |
| 2025/0227048 A1 * | 7/2025 | Ly | H04L 67/10 |

FOREIGN PATENT DOCUMENTS

| | | |
|---|---|---|
| JP | 200255713 | 2/2002 |
| JP | 200262933 | 2/2002 |
| JP | 2002149232 | 5/2002 |
| JP | 2005531826 | 10/2005 |

* cited by examiner

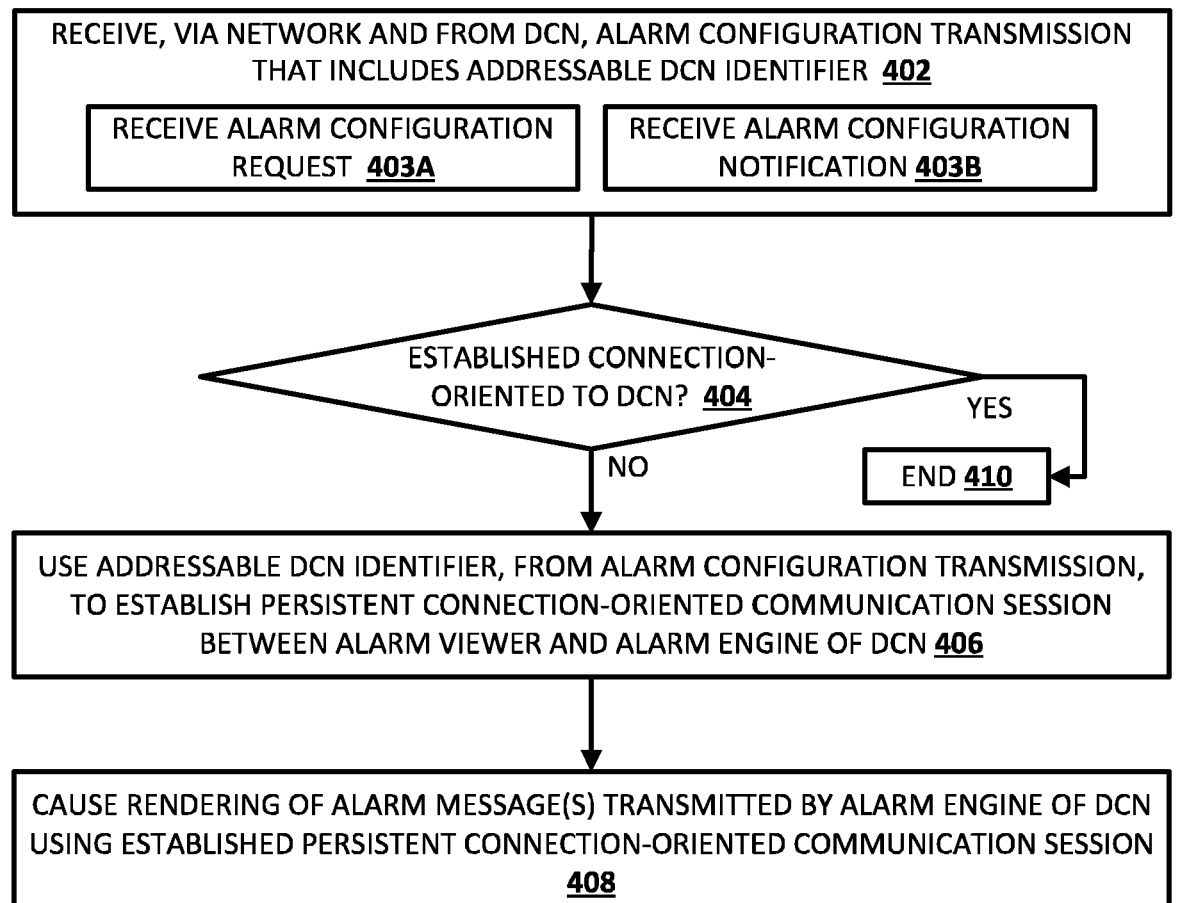
FIG. 4

400B

*ALARM CONFIGURATION SERVICE*

*ALARM VIEWER*

RECEIVE ALARM CONFIGURAITON TRANSMISSION FROM DCN AND VIA NETWORK 402B

NEW DCN ASSOCIATION? 404B1 — NO → END 410B

YES

GENERATE, IN ALARMS DATABASE, NEW ASSOCIATION OF DATA FROM ALARM CONFIG. TRANMISSION TO ADDRESSABLE DCN IDENTIFIER OF ALARM CONFIG. TRANSMISSION 406B1

NEW DCN IN ALARMS DB W/O ESTABLISHED CONNECTION-ORIENTED? 404B2 — NO

YES

USE NEW ADDRESSABLE DCN IDENTIFIER FROM ALARMS DB TO ESTABLISH PERSISTENT CONNECTION-ORIENTED COMMUNICATION SESSION WITH ALARM ENGINE OF DCN 406B2

CAUSE RENDERING OF ALARM MESSAGE(S) TRANSMITTED BY ALARM ENGINE OF DCN USING ESTABLISHED PERSISTENT CONNECTION-ORIENTED COMMUNICATION SESSION 408B

FIG. 6

700

```
┌─────────────────────────────────────────────────────────────────────────┐
│        RECEIVE ALARM CONFIGURATION FILES AND THEIR ASSOCIATED FUNCTION BLOCK │
│                         IDENTIFIERS 702                                    │
│   ┌──────────────────────────────┐   ┌──────────────────────────────┐    │
│   │ RECEIVE VIA BULK UPLOAD 702A │   │ RECEIVE VIA CONFIG GUI 702B  │    │
│   └──────────────────────────────┘   └──────────────────────────────┘    │
└─────────────────────────────────────────────────────────────────────────┘
```

STORE, IN ALARMS DATABASE, ALARM CONFIGURATION FILES, EACH IN ASSOCIATION WITH A CORRESPONDING FUNCTION BLOCK IDENTIFIER 704

RECEIVE, FROM DCN VIA NETWORK, AN ALARM CONFIGURATION REQUEST THAT INCLUDES FUNCTION BLOCK IDENTIFIER AND ADDRESSABLE DCN IDENTIFIER 706

RETRIEVE, FROM ALARMS DATABASE, ALARM CONFIGURATION FILE BASED ON IT BEING STORED IN ASSOCIATION WITH FUNCTION BLOCK IDENTIFIER 708

TRANSMIT, TO DCN VIA NETWORK AND IN RESPONSE TO REQUEST, ALARM CONFIGURATION FILE 710

STORE, IN ALARMS DATABASE IN ASSOCIATION WITH ALARM CONFIGURATION FILE AND/OR FUNCTION BLOCK IDENTIFIER, DCN IDENTIFIER ASSOCIATED WITH ALARM CONFIGURATION REQUEST 712

YES      ANOTHER REQUEST? 714    NO

FIG. 7

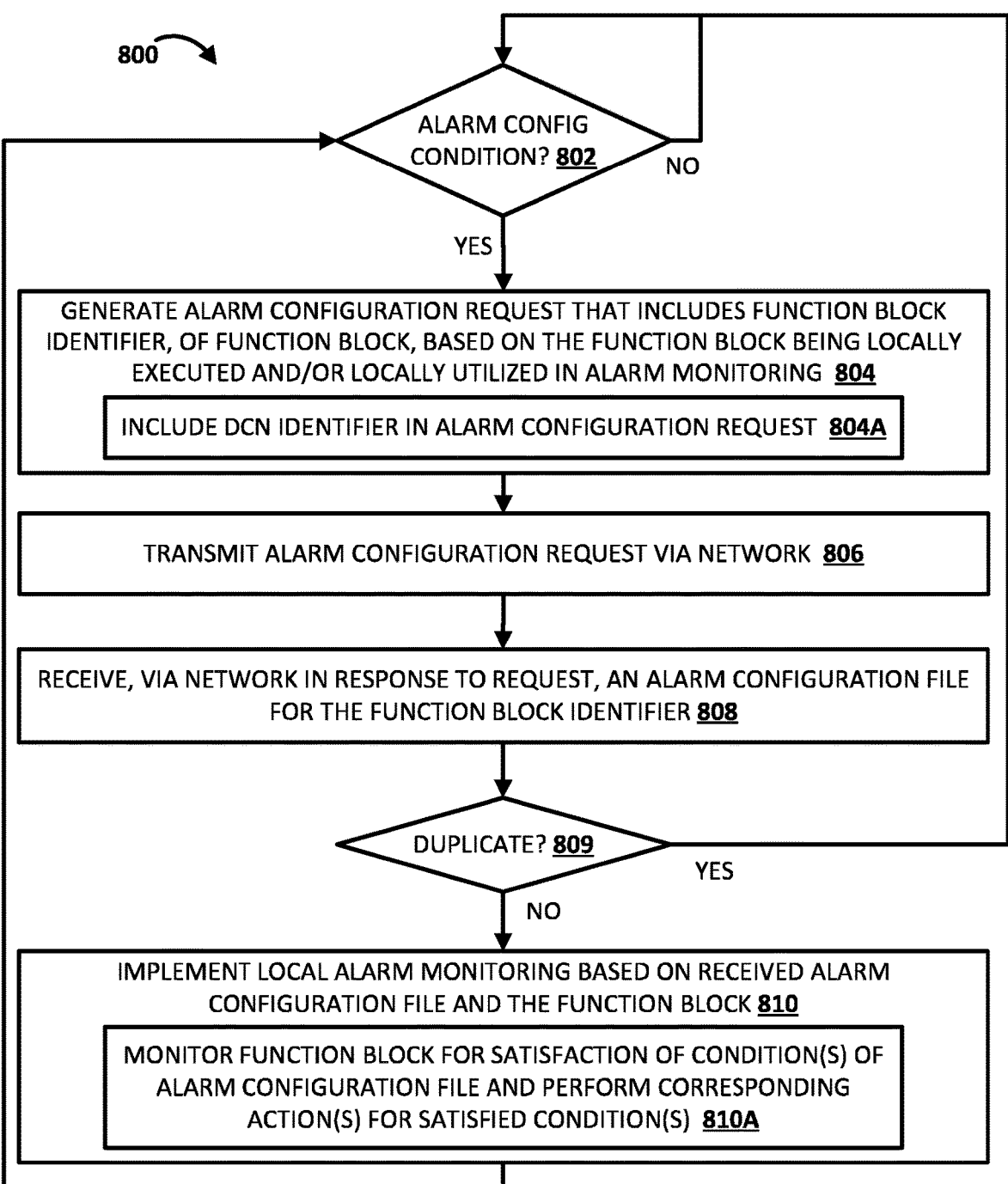

800

ALARM CONFIG
CONDITION? 802          NO

YES

GENERATE ALARM CONFIGURATION REQUEST THAT INCLUDES FUNCTION BLOCK
IDENTIFIER, OF FUNCTION BLOCK, BASED ON THE FUNCTION BLOCK BEING LOCALLY
EXECUTED AND/OR LOCALLY UTILIZED IN ALARM MONITORING  804

INCLUDE DCN IDENTIFIER IN ALARM CONFIGURATION REQUEST  804A

TRANSMIT ALARM CONFIGURATION REQUEST VIA NETWORK  806

RECEIVE, VIA NETWORK IN RESPONSE TO REQUEST, AN ALARM CONFIGURATION FILE
FOR THE FUNCTION BLOCK IDENTIFIER 808

DUPLICATE? 809          YES

NO

IMPLEMENT LOCAL ALARM MONITORING BASED ON RECEIVED ALARM
CONFIGURATION FILE AND THE FUNCTION BLOCK 810

MONITOR FUNCTION BLOCK FOR SATISFACTION OF CONDITION(S) OF
ALARM CONFIGURATION FILE AND PERFORM CORRESPONDING
ACTION(S) FOR SATISFIED CONDITION(S) 810A

FIG. 8

ALARM VIEWER ESTABLISHMENT OF CONNECTION-ORIENTED COMMUNICATION WITH A DISTRIBUTED CONTROL NODE OF A PROCESS AUTOMATION SYSTEM

BACKGROUND

Alarms are utilized in process automation systems to detect potential anomalies and to cause action(s) to be performed responsive to detecting a potential anomaly. A potential anomaly can be one with the process automation system and/or one with the process automation process for which the process automation system is deployed. The action(s) for an alarm can include, for example, causing a corresponding notification to be rendered at interface(s) monitored by operator(s) and/or automatically causing remediation(s) to be performed (e.g., an automation process or sub-process automatically halted or throttled). As an example, an alarm can be configured to monitor sensor readings, from a sensor of the process automation system, and to cause a corresponding notification to be rendered if the sensor readings are above a high value (and/or a high-high value) and/or are below a low value (and/or a low-low value).

In some process automation systems, hardware and/or software of process automation control nodes, of the process automation system, can all be supplied and/or managed by a single entity (e.g., a single company). This enables the single entity to utilize its own proprietary techniques to create and manage alarms that are associated with corresponding process automation control nodes.

However, other process automation systems include heterogeneous hardware and/or heterogeneous software that are supplied and/or managed by a plurality of entities and/or that are deployed in a distributed manner. For example, a process automation system can include some process automation control nodes that are supplied and/or managed by a first entity, other process automation control nodes that are supplied and/or managed by a second entity, etc. Each process automation control node can have different hardware and/or software specifications, including different function block(s) that define control(s) performed by the process automation control node.

A process automation control node can include a distributed control node (DCN) that includes hardware (e.g., processor(s), memory, network interface(s), input and/or output port(s), and/or other hardware) as well as software (e.g., function block(s)) that is executed by at least some of the hardware. For example, the software can be included in memory of the DCN and can be executed by processor(s) of the DCN. The software of a DCN can, for example, utilize data from input port(s) of the DCN and/or data from other DCN(s) during execution and/or can generate output for providing over output port(s) and/or a network interface (e.g., transmitting to one or more endpoint(s) via a process automation network of the process automation system).

SUMMARY

Various technical challenges are presented in generating, updating, and/or deploying process automation alarms in a process automation system that includes distributed and/or heterogeneous hardware and/or software. For example, a process automation alarm can require monitoring, by an alarm engine, of process variable(s) of particular function block(s), such as input variable(s), output variable(s), and/or internal variable(s) of the particular function block(s). The DCN(s) generating and/or enabling access to process variable(s) must be accessible to the alarm engine to enable monitoring of those process variable(s) by the alarm engine. Further, the alarm engine must have access to and utilize appropriate alarm configuration file(s) in monitoring for occurrence of corresponding alarm condition(s) and causing corresponding action(s) to occur in response. An alarm configuration file can define condition(s), for corresponding process variable(s) that when satisfied, cause the alarm engine to initiate corresponding action(s).

Yet further, when the action(s) that are initiated in response to alarm condition(s) being satisfied include initiating rendering (e.g., visual and/or audible rendering) of corresponding output via an alarm viewer, establishment of a persistent connection-oriented communication session between the alarm engine and the alarm viewer can be required or desired. For example, establishment of a persistent connection-oriented communication session between the alarm engine and the alarm viewer can be desired to ensure security and/or robustness of the alarm viewer, to ensure low-latency rendering of output(s) in response to an alarm message, to lessen traffic on a process automation network (via which the connection-oriented communication session can be established), and/or to enable the alarm viewer to recognize when an alarm engine is not active.

As one particular example, the alarm viewer can be configured to react only to alarm events provided via connection-oriented communication sessions (via a process automation network), with alarm engines, that the alarm viewer established. This can prevent reaction by the alarm viewer to any erroneous alarm messages that are transmitted (e.g., accidentally or nefariously) over the process automation network but not transmitted via a connection-oriented communication session that the alarm viewer established. As another particular example, the connection-oriented communication session can ensure data corresponding to an alarm event is delivered in order and/or is delivered over the same path, which can reduce latency in the alarm viewer receiving and acting upon the alarm event. As yet another particular example, the connection-oriented communication sessions can be via a reliable protocol whereby the alarm viewer provides acknowledgement of delivery of alarm message data to a corresponding alarm engine and/or provides an automatic repeat request when there is missing or corrupted data. This can ensure that the alarm viewer is robust and actually receives and acts upon alarm event data. As an additional particular example, an alarm event provided over a connection-oriented communication session will not be broadcasted to various other DCNs and/or other components also connected to the process automation network, thereby lessening network traffic at those various components. As another additional particular example, establishment of a connection-oriented communication session between an alarm engine and the alarm viewer can enable the alarm viewer to determine, based on whether the connection-oriented communication session remains established, whether the alarm engine is truly active—and to provide notification(s) when an alarm engine is determined to not be truly active. For instance, when the alarm engine determines that a previously established connection-oriented communication session with an alarm engine is no longer established, it can provide corresponding notification(s) to operator(s). A connection-oriented communication session no longer being established can be due to, for example, the alarm engine crashing, the DCN on which the alarm engine is implemented being disconnected from the network, and/or the DCN malfunctioning.

However, due to the distributed and/or heterogeneous nature of the process automation system, achieving one or more of the desires and/or requirements mentioned above can be cumbersome and/or error prone. As one example, assume that an alarm configuration file is locally stored on a particular DCN and is being utilized, by a local alarm engine of the particular DCN, in monitoring process variable(s) of a particular function block on the particular DCN (e.g., monitoring values for those variable(s) during execution of the particular function block). Further assume that the alarm configuration file is locally stored and utilized by the particular DCN based on being pre-loaded on the particular DCN (prior to commissioning of the DCN in the process automation system) or based on being manually configured via a human-machine interface (HMI) coupled to the DCN during commissioning. Yet further, assume that an alarm viewer has an established connection-oriented communication session with the particular DCN based on a network addressable DCN identifier (also referred to herein as "addressable DCN identifier"), of the DCN, being previously manually provided (e.g., based on engineer input) at an interface of the alarm viewer.

If the particular DCN is replaced with a new DCN, executing the same function block(s), it can require manual pre-loading of the alarm configuration file on the new DCN or manually configuring the new DCN via the HMI. Moreover, it can require that a new addressable DCN identifier, of the new DCN, be manually provided to an interface of the alarm viewer to enable the alarm viewer to establish a connection-oriented communication session with the new DCN. In addition to manual pre-loading of the alarm configuration file or configuring of the new DCN via the HMI being cumbersome and requiring utilization of computing resource(s), error(s) in either approach can result in corresponding alarm(s) not being truly active or not being accurate (e.g., due to incorrect condition(s) being defined). Moreover, in addition to manually providing the new addressable DCN identifier to the alarm viewer being cumbersome and requiring utilization of computing resource(s), error(s) in the providing (e.g., specifying a wrong addressable DCN identifier) and/or neglecting to provide the new addressable DCN identifier can result in the alarm viewer not establishing a connection-oriented communication session with the new DCN, making the corresponding alarm(s) effectively inactive (i.e., corresponding notification(s) will not be provided at the alarm viewer due to no connection-oriented communication session being established). Accordingly, a lack of monitoring for occurrence of the condition(s) of the alarm(s) and/or a lack of any corresponding action(s) being taken can result. This, in turn, can result in hazardous conditions or other negative consequences in the process automation setting.

As another example, upon initial commissioning of DCNs of a process automation system there can be hundreds or thousands of alarm configuration files that need to be deployed at appropriate DCNs for effective alarm monitoring. However, due the distributed and/or heterogeneous nature of the process automation system, it can be cumbersome and/or error prone to determine which DCN is the appropriate DCN for a corresponding alarm configuration file. For example, it may not be readily apparent, out of hundreds or thousands of DCNs, which DCN's alarm engine will be tasked with utilizing a corresponding alarm configuration file. Manually locating the appropriate DCN can be cumbersome and/or error prone, which can result in the corresponding alarm configuration file being deployed to the wrong DCN and corresponding alarm monitoring not being truly active. Moreover, it can be cumbersome and/or error prone to determine which DCNs, out of hundreds or thousands of DCNs, have active alarm monitoring. Further, it can be cumbersome and/or error prone to manually provide addressable DCN identifiers, for such DCNs, to an interface of the alarm viewer to enable the alarm viewer to establish a connection-oriented communication session with the new DCN.

Implementations disclosed herein address these and other challenges by causing any DCN that includes a corresponding active alarm engine to selectively transmit a corresponding alarm configuration transmission (e.g., an alarm configuration request or an alarm configuration notification). An alarm configuration transmission from a DCN includes (e.g., in a header and/or in a body of the transmission) an addressable DCN identifier of the DCN (e.g., an IP address or a MAC address of the DCN) and also includes a direct or indirect indication that the DCN is implementing alarm monitoring that is based on function block(s) of the process automation system.

Further, implementations address these and other challenges by, in response to receiving the alarm configuration transmission and determining that no persistent connection-oriented communication session is established between an alarm viewer and the DCN indicated by the addressable DCN identifier of the alarm configuration transmission, causing the alarm viewer to establish a persistent connection-oriented communication session with the DCN using the addressable DCN identifier. For example, a push notification that includes the addressable DCN identifier can be automatically transmitted to the alarm viewer to cause the alarm viewer to automatically establish a Transmission Control Protocol (TCP) connection or other connection-oriented communication session with the DCN, optionally after the alarm viewer verifies one is not already established. As another example, the alarm viewer can be caused to automatically establish the connection-oriented communication session by storing of the addressable DCN identifier in an alarms database that the alarm viewer is tasked with monitoring (e.g., at regular or non-regular intervals). For example, the alarm viewer can monitor the alarms database for presence of addressable DCN identifier(s) for which it does not have a corresponding established connection-oriented communication session and, in response to identifying such an addressable DCN identifier, establish a connection-oriented communication session therewith.

As referenced above, a connection-oriented communication session between an alarm viewer and an alarm engine of a DCN can be established responsive to receiving an alarm configuration transmission from the DCN and determining that a connection-oriented communication session is not currently established with an addressable DCN identifier included in the alarm configuration transmission. In some implementations or situations, the alarm configuration transmission is an alarm configuration request that includes function block identifier(s). The DCN can include the function block identifier(s) in the alarm configuration request based on the corresponding function block(s) being executed by the DCN and/or being assigned for use in alarm monitoring by the DCN. Further, and as described herein, an alarm configuration service can respond to the alarm configuration request by transmitting, to the DCN, alarm configuration file(s) in response to determining that each of the alarm configuration file(s) is assigned to a corresponding one of the function block identifier(s) of the alarm configuration request. This can enable, for example, a newly commissioned DCN that implements an alarm engine to obtain appropriate alarm configuration file(s) from the alarm configuration service. This can additionally or alternatively enable, for example, an already commissioned DCN to obtain new alarm configuration file(s) that have been specified via the alarm configuration service but not yet provided to the DCN for implementation by the alarm engine thereof.

In some additional or alternative implementations or situations, the alarm configuration transmission is an alarm configuration notification that includes function block identifier(s) and that specifies corresponding alarm configuration file(s) that were pre-loaded on the DCN and/or created locally at the DCN (e.g., via a direct connection with a human machine interface (HMI)). This can enable, for example, an alarm configuration service that receives the alarm configuration notification to update an alarms database to reflect, for example, association(s) of the alarm configuration file(s) to the function block(s). This, in turn, can enable an operator (e.g., an engineer) to remotely view, via access to the alarms database, the alarm configuration file(s) and their associations to the function block(s) and/or to remotely modify the alarm configuration file(s). Remotely modified alarm configuration files can then optionally be provided to the DCN responsive to an alarm configuration request as described herein.

As referenced above, some implementations disclosed herein assign, in an alarms database accessible via the process automation network, each alarm to a corresponding function block identifier. The function block identifier assigned to an alarm can be an alias of the function block corresponding to the alarm, and can be unique relative to the aliases of all other function blocks of the process automation system. The assignment of an alarm to the function block identifier can be an assignment of an alarm configuration file to the function block identifier. Further, the assignment of the alarm to the function block identifier can be in addition to (or in lieu of) any assignment of the alarm to a corresponding DCN identifier, such as network addressable identifier of the DCN.

For example, a given function block can have a function block identifier of "FT101.PV". The function block identifier "FT101.PV" can be generated by a programmer of the given function block when creating the given function block, or can be automatically created, and can be created or generated so that it is unique relative to all other function block identifiers of all other function blocks of the process automation system. In some implementations, part of the function block identifier can indicate a type of the function block and can conform to a standardized type designation scheme. For example, "PV" in "FT101.PV" can indicate the function block is of a "process variable" type. Also, for example, ".AI" can indicate a function block of an "analog input" type, ".AO" can indicate a function block of an "analog output" type, and/or ".PID" can indicate a function block of a "proportional-integral-derivative" type. In some of those or other implementations, at least part of the function block identifier may not conform to any standardized designation scheme, but may be semantically meaningful and/or conform to a non-standardized designation scheme of programmer(s) and/or an entity (or entities) implementing the process automation system. "FT101", in "FT101.PV", is an example of such a part of a function block identifier. For example, in a process automation system there may be multiple function block identifiers that end in ".PV". However, only one of those will include "FT101"

before the ".PV" and, further, all of those will include unique character(s), relative to one another, before the ".PV".

An alarm configuration file, assigned to the given function block, can be generated (e.g., by an engineer or other human operator) and can dictate condition(s), of process variable(s) of the given function block, and corresponding action(s) that should occur if the condition(s) are satisfied. For example, an alarm configuration file for "FT101.PV" can dictate condition(s), of a process variable of "FT101.PV", and can dictate descriptor(s) or other message(s) that should be presented (e.g., in an alarm viewer) if corresponding condition(s) are satisfied. For instance, the condition(s) can include the process variable exceeding a threshold rate of change over a specified time, or can include the process variable being out of range of high-high, high, low, and/or low-low setpoint value(s).

Further, and as also referenced above, some implementations enable a process automation node, such as a DCN, to transmit, via the process automation network, an alarm configuration request that includes function block identifier(s). For example, the DCN can include a function block identifier in the alarm configuration request in response to the corresponding function block being executed by the DCN. As another example, the DCN can include the function block identifier in the alarm configuration request in response to the corresponding function block being monitored by an alarm engine of the DCN (e.g., an alarm engine executed by a server implemented by the DCN). A function block, monitored by an alarm engine of a DCN, can be one that is also executed by the DCN or it can be one that is executed by an additional DCN, but nonetheless monitored by the DCN via communications between the DCN and the additional DCN. The communications between the DCN and the additional DCN can be via the process automation network and/or via another channel.

An alarm configuration service can be implemented on one or more server(s) coupled to the process automation network, and can manage the alarms database and/or transmit addressable DCN identifier(s) to an alarm viewer as described herein. The alarm configuration service can receive the alarm configuration request from the DCN and search the alarms database, using the function block identifier(s) of the request, to retrieve alarm configuration file(s) that are assigned to the function block identifier(s) in the alarms database. The alarm configuration service can transmit, in response to the alarm configuration request, the retrieved alarm configuration file(s) to the DCN for implementation thereof by an alarm engine of the DCN. In these and other manners, a newly commissioned DCN (e.g., commissioned upon initial commissioning of the process automation system or commissioned to replace a removed DCN) can obtain appropriate alarm configuration file(s) to implement utilizing only function block identifier(s) of function block(s) that are utilized by (e.g., executed by and/or assigned for use in alarm monitoring by) the newly commissioned DCN. Further, the alarm configuration service can optionally retrieve and provide the alarm configuration file(s) without any reference to an addressable DCN identifier of the particular DCN on which the given function block will be implemented. However, as described herein, the alarm configuration service can utilize an addressable DCN identifier, of the particular DCN, to cause an alarm viewer to establish a connection-oriented communication session with the particular DCN (e.g., by storing the addressable DCN identifier in the alarms database and/or including it in a push notification transmitted to the alarm viewer).

Utilization of assignment of the alarms to function block identifiers, in deploying alarms according to implementations disclosed herein, can enable alarm deployment that is robust in the distributed and/or heterogeneous process automation system setting and/or that mitigates errors in such a setting. For example, utilization of function block identifiers, in lieu of DCN identifiers, in determining which alarm configuration file(s) to provide in response to an alarm configuration request, can mitigate issues that might otherwise arise with old DCNs being replaced with new DCNs (with new DCN identifiers), alarm engine monitoring functionality being switched from a given DCN (with a given DCN identifier) to alternate DCN(s) (with alternate DCN identifier(s)), etc.

In various implementations, an alarm configuration request can be issued by a DCN responsive to the DCN detecting occurrence of one or more alarm configuration conditions. For example, an alarm configuration request can be issued by a DCN responsive to the DCN determining it is newly commissioned (e.g., newly added to the process automation system), determining it has been powered up (e.g., initially or after a restart), determining that its alarm engine is assigned to monitor function block(s) but that monitoring not being currently active (e.g., due to lacking any alarm configuration file(s) for the function block(s)), determining that is has been more than a threshold duration of time since it last issued an alarm configuration request, receiving an update request from the alarm configuration service, and/or detecting occurrence of other condition(s). Causing a DCN to issue the alarm configuration request in response to detecting such certain condition(s) can ensure that the DCN proactively seeks alarm configuration file(s) in situation(s) where they are likely needed. Additionally or alternatively, by preventing issuance of an alarm configuration request by the DCN when the certain condition(s) are not detected, resources of the process automation system can be conserved. For example, network resources can be conserved such as those utilized in transmitting the alarm configuration request from the DCN to the alarm configuration service and/or those utilized by the alarm configuration service in responding to the alarm configuration request.

In various implementations an alarm configuration request or alarm configuration update that is issued by a DCN (or a separate transmission, from the DCN, provided in conjunction with the alarm configuration request) can include an addressable DCN identifier (e.g., an IP address and/or a MAC address) of the particular DCN. In some versions of those implementations, the alarm configuration service can, based on the alarm configuration request including the addressable DCN identifier, update the alarms database to assign the addressable DCN identifier to an alarm configuration file (e.g., returned responsive to an alarms configuration request or received along with an alarms configuration notification) and/or to the function block identifier (included in the alarms configuration request or the alarms configuration notification). In some of those versions, the alarm viewer is tasked with monitoring the alarms database for presence of addressable DCN identifier(s) for which it does not have a corresponding established connection-oriented communication session and, in response to identifying such an addressable DCN identifier, the alarm viewer can establish a connection-oriented communication session therewith. In some additional or alternative versions of those implementations, the alarm configuration service can, based on the alarm configuration request including the addressable DCN identifier, additionally or alternatively transmit a push notification, that includes the addressable DCN identifier, to the alarm viewer to cause the alarm viewer to automatically establish a connection-oriented communication session with the DCN. Optionally, the alarm configuration service can transmit the push notification only after first determining that the alarm viewer has not already established a connection-oriented communication session with the DCN. Such a determination can be based on, for example, data provided by the alarm viewer and/or data included in the alarms database.

An addressable DCN identifier assigned in the alarms database can be used for one or more additional or alternative purposes beyond the alarm engine establishing a connection-oriented communication session with the DCN. For example, such purpose(s) can additionally or alternatively include utilization of the DCN identifier to push alarm configuration file updates to the particular DCN. For example, if an alarm configuration file is updated (e.g., by an engineer) a notification can be transmitted to the particular DCN using the DCN identifier, and can be transmitted using the DCN identifier based on it being assigned to the alarm configuration file. The notification can cause the particular DCN to then issue an alarm configuration request with corresponding function block identifier(s), resulting in the particular DCN receiving the updated alarm configuration file.

A new addressable DCN identifier can be assigned, to the alarm configuration file and/or to the function block identifier and in the alarms database, in response to a later alarm configuration transmission that includes the new addressable DCN identifier and the function block identifier and/or the alarm configuration file. For example, assume the particular DCN is replaced with a replacement DCN having a new addressable DCN identifier. In response to the replacement DCN transmitting an alarm configuration request or an alarm configuration notification, the alarm configuration service can supplant, in the database, the assignment(s) of the addressable DCN identifier with assignment(s) of the new addressable DCN identifier to the alarm configuration file and/or to the function block identifier. In implementations where the alarm viewer is tasked with monitoring the alarms database for presence of addressable DCN identifier(s) for which it does not have a corresponding established connection-oriented communication session, the alarm viewer can identify the new addressable DCN identifier as such a DCN identifier, and establish a connection-oriented communication session therewith in response. In response to a later alarm configuration transmission that includes a new addressable DCN identifier and the function block identifier and/or the alarm configuration file, the configuration service can additionally or alternatively transmit a push notification, that includes the new addressable DCN identifier, to the alarm viewer to cause the alarm viewer to automatically establish a connection-oriented communication session with the DCN.

Accordingly, implementations disclosed herein enable effective deployment of alarm configuration files to appropriate process automation nodes as those process automation nodes are brought online in a newly commissioned process automation system—and ensure that an alarm viewer establishes connection-oriented communication sessions with those process automation nodes. Further, implementations additionally or alternatively enable robust adaptation to replacement and/or modification of process automation nodes and/or other system component(s) in an active process automation system—and ensure that an alarm viewer establishes connection-oriented communication sessions with those replacement and/or modified process automation nodes. For example, implementations enable robust alarm adaptation and establishing of a connection-oriented communication session when a first DCN executing and/or monitoring first function blocks is replaced by a second DCN (e.g., with different hardware specification(s)) also executing and/or monitoring the first function blocks.

The above description is provided as an overview of some implementations of the present disclosure. Further description of those implementations, and other implementations, are described in more detail below.

In addition, some implementations include one or more processors of one or more devices, where the one or more processors are operable to execute instructions stored in associated memory, and where the instructions are configured to cause performance of any of the aforementioned methods. The processor(s) can include various hardware processors such as central processing unit(s) (CPU(s)), application-specific integrated circuit(s) (ASIC(s)), field-programmable gate array(s) (FPGA(s)), graphics processing unit(s) (GPU(s)), digital signal processor(s) (DSP(s)), and/or other processor(s). Some implementations additionally or alternatively include one or more transitory or non-transitory computer readable storage media storing computer instructions executable by one or more processors to perform any of the methods disclosed herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates an example method of using an addressable DCN identifier, received in an alarm configuration transmission from the DCN, to establish a persistent connection-oriented communication session between an alarm viewer and an alarm engine of the DCN.

FIG. 6 illustrates another particular implementation of the example method of FIG. 4.

FIG. 7 illustrates an example method of storing alarm configuration files in association with function block identifiers, and transmitting an alarm configuration file in response to an alarm configuration request that includes the function block identifier associated with the alarm configuration file.

FIG. 8 illustrates an example method of generating and transmitting an alarm configuration request, receiving an alarm configuration file in response, and implementing local alarm monitoring based on the received alarm configuration file.

DETAILED DESCRIPTION

Implementations disclosed herein relate to ensuring robust and/or accurate alarm monitoring based on function blocks implemented by DCNs of a process automation system. At least a subset of such function blocks are each utilized in implementing at least part of a corresponding at least partially automated process. As used herein, an "at least partially automated process" includes any process cooperatively implemented within a process automation system by multiple devices with little or no human intervention. One common example of an at least partially automated process is a process loop in which one or more actuators are operated automatically (without human intervention) based on output of one or more sensors. Some at least partially automated processes can be sub-processes of an overall process automation system workflow, such as a single process loop mentioned previously. Other at least partially automated processes can include all or a significant portion of an entire process automation system workflow. In some cases, the degree to which a process is automated can exist along a gradient, range, or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, and/or other domain(s).

Figure 1:
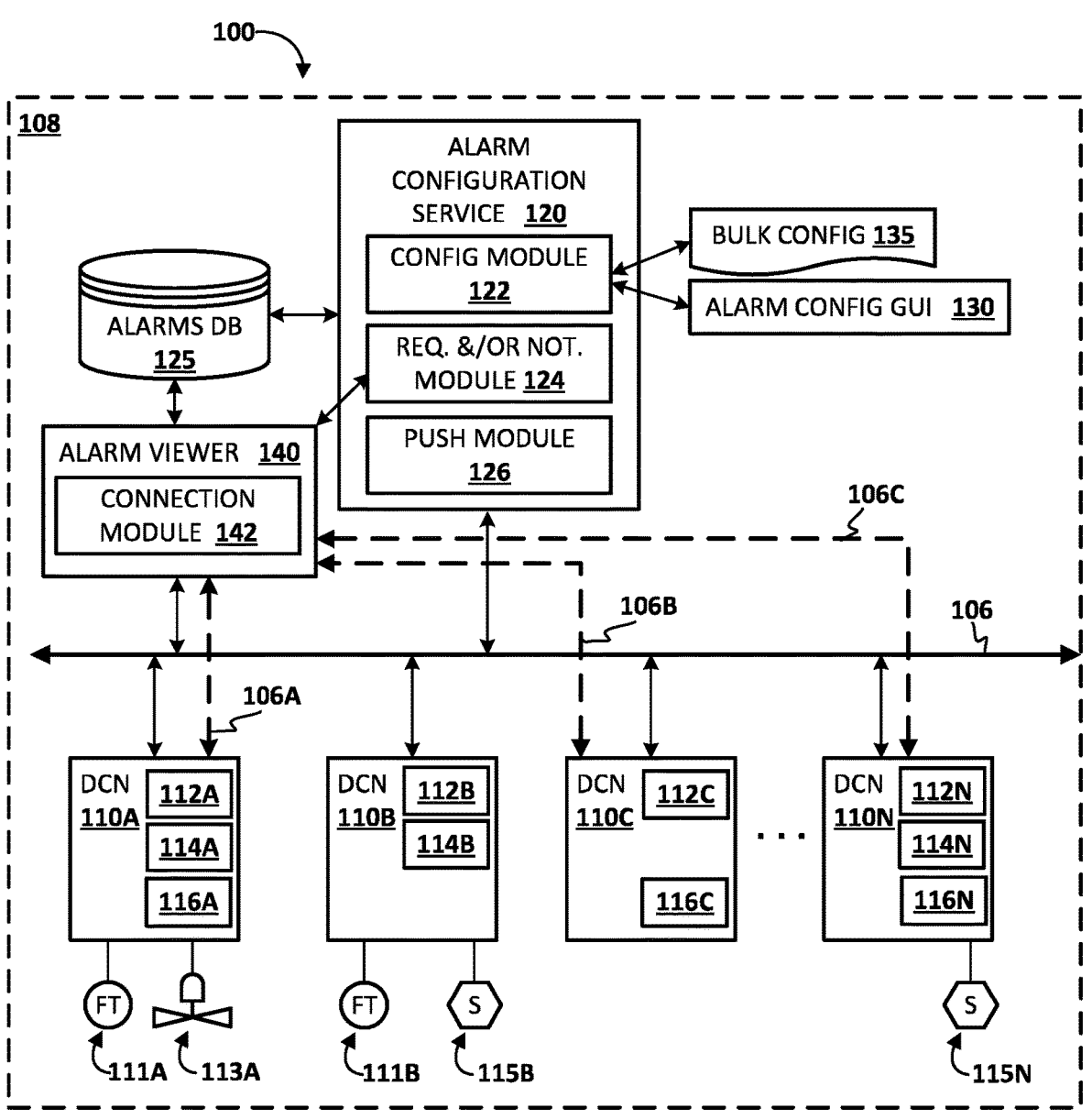
FIG. 1 illustrates an example environment in which selected aspects of the present disclosure can be implemented, in accordance with various implementations.

Referring now to FIG. 1, an example environment 100 in which various aspects of the present disclosure can be implemented is depicted schematically. Environment 100 includes a process automation system 108 that can be implemented in various industrial settings, such as part of a chemical processing plant, an oil or natural gas refinery, a catalyst factory, a manufacturing facility, or other industrial setting(s). Process automation system 108 is illustrated in FIG. 1 as including an alarm configuration service 120, an alarms database 125, an alarm configuration graphical user interface (GUI) 130, an alarm viewer 140, a process automation network 106, and distributed control nodes (DCNs) 110A-110N. The process automation system 108 can include various additional components. However, those are not illustrated in FIG. 1 for the sake of simplicity.

Process automation network 106 can be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 can be configured with redundancies and/or backups to provide high availability (HA) and/or high quality of service (QOS). Additionally, nodes that exchange data over process automation network 106 can implement time-sensitive networking (TSN) to facilitate time synchronization and/or real-time control streams. Various nodes/devices are operably coupled with process automation network 106, such as alarm configuration service 120, alarm viewer 140, and DCNs 110A-N.

DCNs 110A, 110B, 110C, and 110N are illustrated in FIG. 1. However, it is noted that additional (e.g., hundreds of or even thousands of) DCN(s) can be provided in process automation system 108, as indicated by the ellipsis between DCN 110C and DCN 110N. Some DCNs in process automation system 108 can have input(s)/output(s) (I/O(s)) for coupling with sensor(s), human machine interface(s) (HMI(s)), actuator(s), and/or other components. Other DCN(s) in process automation system 108 can optionally omit I/O(s).

DCN 110A is coupled, via a first I/O, to a flow transmitter (FT) component 111A and, via a second I/O to an actuator (e.g., a valve) 113A. The actuator 113A, and other actuators described herein, can be an electric, hydraulic, mechanical, and/or pneumatic component that is controllable to affect some aspect of a process automation workflow that occurs at process automation facility 108. The FT component 111A includes sensor(s) that provide sensor data indicating flow rate of a corresponding fluid flow and also includes actuator(s) that can be adjusted to control the corresponding fluid flow. Sensors described herein can take various forms, including but not limited to a pressure sensor, a temperature sensor, a flow sensor, various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and/or other form(s).

DCN 110A includes processor(s) 112A that can utilize associated memory (and corresponding instructions stored therein) for implementing corresponding function(s) of the DCN 110A. Those function(s) include implementing function block(s) 114A of DCN 110A, which can be stored in some of the associated memory. Those function(s) also include implementing an alarm engine 116A.

Each of the function block(s) 114A of DCN 110A can define one or more aspects of sensor monitoring and/or actuator control that is performed by DCN 110A. In some implementations, each of the function block(s) 114A is a corresponding software model that contains input/output variable(s), through variable(s), internal variable(s), and/or an internal behavior description of the function(s) to be performed by the function block. As a non-limiting example, one of the function block(s) 114A of DCN 110A can control an actuator of FT component 111A based on sensor data from sensor(s) of FT component 111A. As another non-limiting example, another of the function block(s) 114A of DCN 110A can control the actuator 113A in dependence on output(s) from other function block(s), such as other function block(s) implemented at DCN 110A and/or at other DCN(s) 110B-N.

The alarm engine 116A can optionally be implemented utilizing open standard protocol(s). For example, the alarm engine 116A can be implemented by an Open Platform Communications (OPC) Unified Architecture (OPC-UA) server that is executed on the DCN 110A by processor(s) 112A thereof. The alarm engine 116A can utilize alarm configuration file(s), described herein, in monitoring for occurrence of alarm condition(s) dictated by an alarm configuration file and performing corresponding action(s) if the alarm condition(s) are detected. The corresponding action(s) can also optionally be dictated by the alarm configuration file. The condition(s) defined by an alarm configuration file can include, or be restricted to, those that reference process variable(s) of function block(s), such as input variable(s), output variable(s), through variable(s), and/or internal variable(s) of function block(s).

Figure 2:
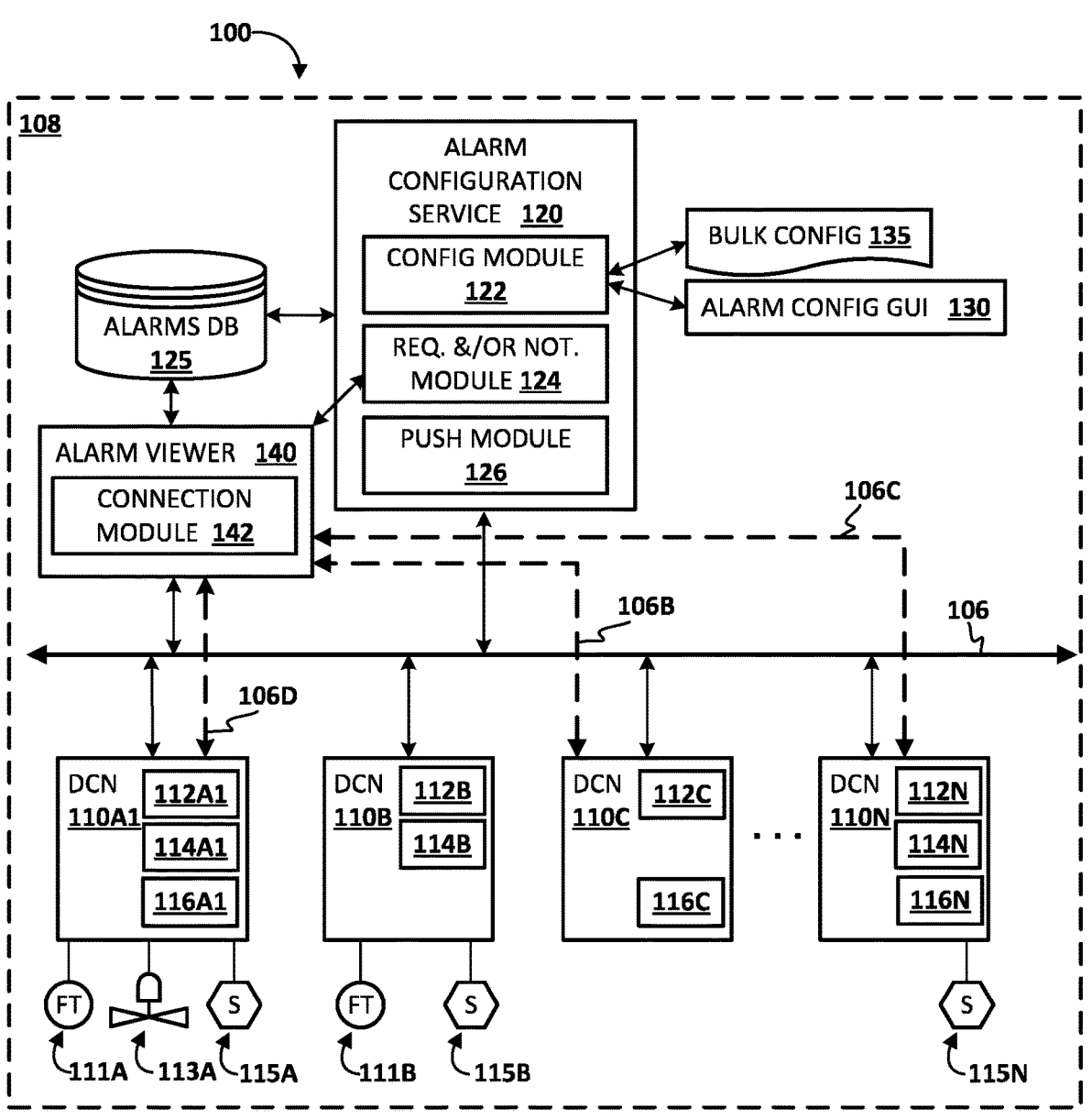
FIG. 2 illustrates the example environment of FIG. 1, after a first DCN of FIG. 1 has been replaced with an alternate DCN.
Figure 3:
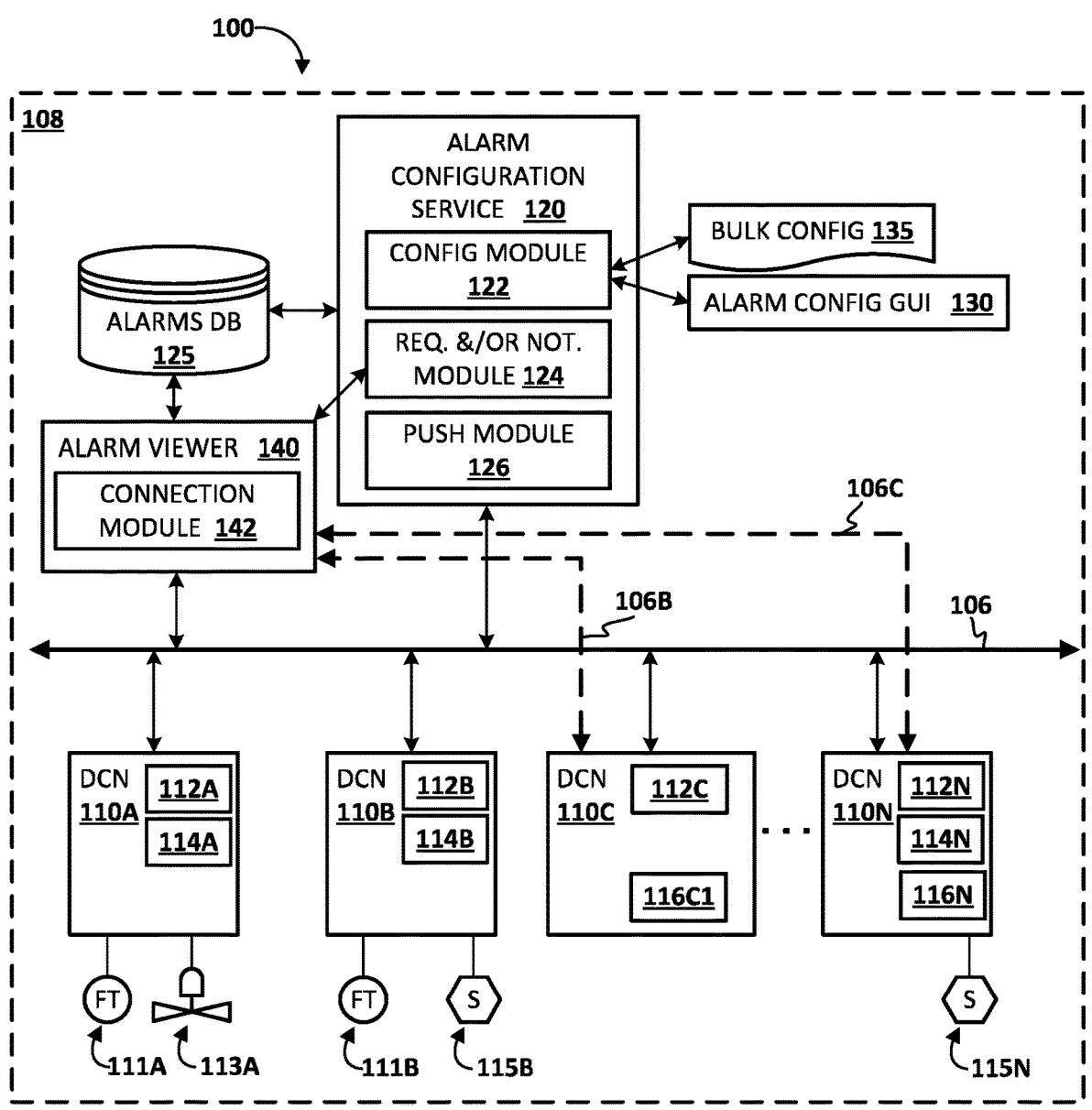
FIG. 3 illustrates the example environment of FIG. 1, after a first DCN of FIG. 1 has been altered to remove alarm monitoring functionality and the alarm monitoring functionality, removed from the first DCN, is implemented on a second DCN.

The action(s) performed in response to an alarm condition being detected by alarm engine 116A can include, for example, sending corresponding data to alarm viewer 140 to cause rendering, at one or more output interface(s), of corresponding audible and/or visual alarm message(s). The sending of the corresponding data can be via a connection-oriented communication session 106A that is established between the alarm engine 116A and the alarm viewer 140. Connection-oriented communication session 106A, and other connection-oriented communication sessions of FIGS. 1-3 are illustrated in dashed bi-directional arrows that are between the respective components via which the connection-oriented communication session is established (e.g., via respective network interfaces of the components). It is noted that the connection-oriented communication sessions will occur via the process automation network 106, but they are nonetheless illustrated as separate bi-directional arrows for ease in explanation. In FIG. 1, the connection-oriented communication session 106A may have been previously established responsive to receiving a prior alarm configuration transmission from DCN 110A as described herein—or even one that is established responsive to manual input provided to the alarm viewer 140. The action(s) performed in response to an alarm condition being detected can additionally or alternatively include causing remediation(s) to be performed. For example, halting and/or altering function block(s) responsible for the alarm condition and/or related function block(s).

As one example, alarm engine 116A can monitor for condition(s) that reference process variable(s) of a function block, of function block(s) 114A, that relate to the FT component 111A. For instance, the condition(s) can define a high-high, high, low, and/or low-low limit(s) for a measured flow variable (based on a sensor of the FT component 111A) of the function block. Also, for instance, the condition(s) can define a maximum rate of change of the measured flow variable. As yet another instance, the condition(s) can define a maximum deviation between the measured flow variable and a setpoint for the flow variable. As another example, alarm engine 116A can additionally or alternatively monitor for condition(s) that reference other process variable(s) of an additional function block, of function block(s) 114A, that relate to the actuator component 113A. For instance, the condition(s) can define state(s) of the actuator component 113A as determined based on input(s) to the additional function block.

As described herein, the DCN 110A can obtain the alarm configuration file(s), that define the alarm(s) to be monitored by the alarm engine 116A, from the alarm configuration service 120 and via the process automation network 106. For example, the DCN 110A can transmit, via the process automation network 106 and to the alarm configuration service 120, an alarm configuration request. The DCN 110A can include, in the alarm configuration request, function block identifier(s) of the function block(s) 114A, and can include them based on them being function block(s) 114A that are executed by the DCN 110A and/or based on them being function blocks for which alarm monitoring is to be performed by alarm engine 116A (when corresponding alarm configuration files are obtained). The DCN 110A can transmit the alarm configuration request in response to detecting occurrence of an alarm configuration condition, such as one or one or more alarm configuration conditions described herein.

DCN 110B is coupled, via a first I/O, to a flow transmitter (FT) component 111B and, via a second I/O to a sensor 115B. DCN 110B includes processor(s) 112B that can utilize associated memory (and corresponding instructions stored therein) for implementing corresponding function(s) of the DCN 110B. Those function(s) include implementing function block(s) 114B of DCN 110B, which can be stored in some of the associated memory. Notably, DCN 110B does not include any corresponding alarm engine and, thus, the function(s) implemented by processor(s) 112B do not include implementing any alarm engine. Rather, alarm monitoring pertinent to function block(s) 114B, of DCN 110A, is performed by DCN 110C (described below). Additionally, it is noted that since DCN 110B does not include any corresponding alarm engine, there is not any connection-oriented communication session that is established between alarm viewer 140 and DCN 110B.

Each of the function block(s) 114B of DCN 110B can define one or more aspects of sensor monitoring and/or actuator control that is performed by DCN 110B. In some implementations, each of the function block(s) 114B is a software model that contains input/output variable(s), through variable(s), internal variable(s), and/or an internal behavior description of the function(s) to be performed by the function block. As a non-limiting example, one of the function block(s) 114B of DCN 110B can control an actuator of FT component 111B based on sensor data from sensor(s) of FT component 111B, sensor data from sensor 115B, and/or sensor data from other sensor(s) (e.g., sensor of FT 111A).

DCN 110C is not coupled to any external component via any I/O and can optionally omit any I/O. Further, DCN 110C does not include any function blocks that it executes. Accordingly, DCN 110C does not implement any function blocks that directly or indirectly "control" any automated process of the process automation system 108. However, processor(s) 112C of DCN 110C do implement an alarm engine 116C that monitors function blocks of other DCN(s) of the process automation system. In some implementations, DCN 110C can be devoted exclusively to alarm monitoring.

Alarm engine 116C can optionally be implemented utilizing open standard protocol(s), such as by an OPC-UA server that is executed on the DCN 110C by processor(s) 112C thereof. The alarm engine 116C can utilize alarm configuration file(s), described herein, in monitoring for occurrence of alarm condition(s) dictated by an alarm configuration file and performing corresponding action(s) if the alarm condition(s) are detected. The condition(s) defined by an alarm configuration file can include, or be restricted to, those that reference process variable(s) of function block(s). The function block(s) to be monitored by alarm engine 116C include those that are not executed by DCN 110C (as DCN 110C does not execute any function blocks). For example, the alarm engine 116C can monitor function block(s) 114B of DCN 110B and/or function block(s) of other DCN(s). For instance, the monitoring of function block(s) 114B, during execution thereof, can be via communications, from DCN 110B, that reflect process variable(s) of the function block(s) 114B during their execution. Such communications can optionally be via a connection-oriented communication session between DCN 110B and DCN 110C via e.g., process automation network 106. As one example, alarm engine 116C can monitor for condition(s) that reference process variable(s) of a function block, of function block(s) 114B, that relate to the sensor component 115B. For instance, the condition(s) can define a high-high, high, low, and/or low-low limit(s) for an internal variable, of the function block of function block(s) 114B, that is dependent on sensor data from the sensor 115B.

The action(s) performed in response to an alarm condition being detected by alarm engine 116C can include, for example, sending corresponding data to alarm viewer 140 to cause rendering, at one or more output interface(s), of corresponding audible and/or visual alarm message(s). The sending of the corresponding data can be via a connection-oriented communication session 106B that is established between the alarm engine 116C and the alarm viewer 140. In FIG. 1, the connection-oriented communication session 106C may have been previously established responsive to receiving a prior alarm configuration transmission from DCN 110C as described herein—or even one that is established responsive to manual input provided to the alarm viewer 140. The action(s) performed in response to an alarm condition being detected can additionally or alternatively include causing remediation(s) to be performed.

As described herein, the DCN 110C can obtain the alarm configuration file(s), that define the alarm(s) to be monitored by the alarm engine 116C, from the alarm configuration service 120 and via the process automation network 106. For example, the DCN 110C can transmit, via the process automation network 106 and to the alarm configuration service 120, an alarm configuration request. The DCN 110C can include, in the alarm configuration request, function block identifier(s) of the function block(s) 114B, and can include them based on them being function block(s) for which alarm monitoring is to be performed by alarm engine 116C (when corresponding alarm configuration files are obtained). The DCN 110C can transmit the alarm configuration request in response to detecting alarm configuration condition(s).

DCN 110N is coupled, via a first I/O, to a sensor 115N. DCN 110N includes processor(s) 112N that can utilize associated memory (and corresponding instructions stored therein) for implementing corresponding function(s) of the DCN 110N. Those function(s) include implementing function block(s) 114N of DCN 110N, which can be stored in some of the associated memory. Those function(s) also include implementing an alarm engine 116N. As described herein, the DCN 110N can obtain the alarm configuration file(s), that define the alarm(s) to be monitored by the alarm engine 116N, from the alarm configuration service 120 and via the process automation network 106.

The action(s) performed in response to an alarm condition being detected by alarm engine 116N can include, for example, sending corresponding data to alarm viewer 140 to cause rendering, at one or more output interface(s), of corresponding audible and/or visual alarm message(s). The sending of the corresponding data can be via a connection-oriented communication session 106C that is established between the alarm engine 116N and the alarm viewer 140. In FIG. 1, the connection-oriented communication session 106C may have been previously established responsive to receiving a prior alarm configuration transmission from DCN 110N as described herein—or even one that is established responsive to manual input provided to the alarm viewer 140.

The alarm configuration service 120 is illustrated as including a configuration module 122, a request and/or notification module 124, and a push module 126. In some implementations, alarm configuration service 120 is implemented within a process automation facility, e.g., within a single building or across a single campus of buildings or other industrial infrastructure. In such an implementation, alarm configuration service 120 may be implemented on one or more local computing systems, such as on one or more server computers. However, in some implementations some or all aspects of alarm configuration service 120 can be implemented in computing system(s) that are remote from the process automation facility. In some of those implementations, the alarm configuration service 120 can be in communication with the process automation network 106 via a wide-area network.

The configuration module 122 can receive alarm configuration files, and assignments of those alarm configuration files to function block identifiers, and store those alarm configuration files and associated function block identifiers in alarms database 125. For example, a first alarm configuration file can be assigned to a first function block identifier of "FT101.PV", a second alarm configuration file can be assigned to a second function block identifier of "FT202.SP", etc. Further, the configuration module 122 can store, in the alarms database 125, the first alarm configuration file and an assignment (e.g., a pointer or other association) of the first alarm configuration file to the "FT101.PV" function block identifier, the second alarm configuration file and an assignment (e.g., a pointer or other association) of the first alarm configuration file to the "FT202.SP" function block identifier, etc.

The alarm configuration files and their associations can be generated based on user interface input(s) from engineer(s) and/or other human(s) implementing and/or maintaining the process automation system 108. In some implementations, some or all of the alarm configuration files and their associations are received via bulk configuration file(s) 135. The bulk configuration files 135 can be, for example, in .csv or other structured or unstructured format, and can be created utilizing one or more programs.

In some implementations, some or all of the alarm configuration files and their associations can be received via an alarm configuration graphical user interface (GUI) 130. The alarm configuration GUI 130 can be implemented via configuration module 122 or can be implemented via a separate component that is at least selectively in communication with the configuration module 122.

The alarm configuration GUI 130 can include graphical interface elements for specifying a function block identifier and for specifying alarm configuration file parameter(s) for the function block identifier. For example, the alarm configuration GUI 130 can include a field for specifying a function block identifier (e.g., from a drop-down menu, via free-form entry, via search or autocomplete based on entered character(s)) and can include field(s) for specifying function block variable(s) and condition(s) for those variable(s). For example, the alarm configuration GUI 130 can enable specification of a function block identifier and, once the function block identifier is specified, can present function block variable(s) for the corresponding function block. Further, each of the function block variable(s) can be selectable and, if selected, corresponding condition(s) for the function block variable(s) can be defined through further interaction with the alarm configuration GUI. The selected function block variable(s) and the condition(s) can then be used to generate a corresponding alarm configuration file, and the corresponding alarm configuration file associated with the function block identifier. Updates to alarm configuration file(s) can be performed via further bulk configuration file(s) and/or via further interaction with the alarm configuration GUI 130. For example, the alarm configuration GUI 130 can enable viewing of, and modification (or even deletion of) existing alarm configuration files in the alarms database 125

(optionally while maintaining their association to function block identifiers and, optionally, to DCN identifiers).

Request and/or notification module 124 receives and processes alarm configuration transmissions (e.g., alarm configuration request(s) and/or alarm configuration notification(s)) from DCNs, such as one or more of DCNs 110A-N, that are received via the process automation network 106.

An alarm configuration request, received by request and/or notification module 124, can include function block identifier(s) of function block(s) and an addressable DCN identifier of the DCN that transmitted the alarm configuration request. In response to receiving the alarm configuration request, the request and/or notification module 124 can access alarms database 125 and identify, in the alarms database 125, function block identifier(s) that match those of the alarm configuration request. Further, the request and/or notification module 124 can identify the alarm configuration file(s) that are stored in association with the matching function block identifier(s). Yet further, the request and/or notification module 124 can transmit, via the process automation network and in response to the alarm configuration request and to the DCN that issued the alarm configuration request, the identified alarm configuration file(s). In some implementations, the request and/or notification module 124 can update the alarms database 125 to store an association of the addressable DCN identifier, included with the alarm configuration request, to the identified function block identifier(s) and/or to the identified alarm configuration file(s). In doing so, the request and/or notification module 124 can remove any stored association(s) of a disparate addressable DCN identifier to the identified function block identifier(s) and/or the identified alarm configuration file(s).

As described herein, the alarm viewer 140 and/or the push module 126 can utilize the stored association of the addressable DCN identifier to the identified function block identifier(s) and/or to the identified alarm configuration file(s). For example, the alarm viewer 140 can use the addressable DCN identifier to establish a corresponding connection-oriented communication session with a corresponding DCN. The alarm viewer 140 can use the addressable DCN identifier to do so in response to detecting the addressable DCN identifier is stored in the alarms database 125 in association with the function block identifier(s) and/or the alarm configuration file(s)—and based on determining it does not already have an established connection-oriented communication session with the corresponding DCN. In some implementations, the request and/or notification module 124 can additionally or alternatively transmit, to the alarm viewer 140, a push notification that includes the addressable DCN identifier to cause the alarm viewer to automatically establish a connection-oriented communication session with the DCN.

An alarm configuration notification, received by request and/or notification module 124, can include an addressable DCN identifier of the DCN that transmitted the alarm configuration notification, and can includes function block identifier(s) and corresponding alarm configuration file(s) that were pre-loaded on the DCN and/or created locally at the DCN. This can enable, for example, an alarm configuration service that receives the alarm configuration notification to update an alarms database to reflect, for example, association(s) of the alarm configuration file(s) to the function block(s). In response to receiving the alarm configuration notification, the request and/or notification module 124 can store, in alarms database 125, the function block identifier(s) and the alarm configuration file(s) of the alarm configuration notification, and an association of the function block identifier(s) to the alarm configuration file(s). In some implementations, the request and/or notification module 124 can also store an association of the addressable DCN identifier, included with the alarm configuration notification, to the received function block identifier(s) and/or to the received alarm configuration file(s). As described herein, the alarm viewer 140 and/or the push module 126 can utilize the stored association of the addressable DCN identifier to the identified function block identifier(s) and/or to the identified alarm configuration file(s). In some implementations, the request and/or notification module 124 can additionally or alternatively transmit, to the alarm viewer 140, a push notification that includes the addressable DCN identifier, of the alarm configuration notification, to cause the alarm viewer to automatically establish a connection-oriented communication session with the DCN.

Push module 126 is optional and, when provided can be used to cause updated alarm configuration file(s) to be provided to corresponding DCN(s) that are utilizing pre-updated version(s) of the alarm configuration file(s). For example, in response to an update of an alarm configuration file via alarm configuration GUI, configuration module 122 can store, in alarms database 125, the updated alarm configuration file in association with its function block identifier, while maintaining any association of the function block identifier to an addressable DCN identifier and/or while creating an association of the updated alarm configuration file to the addressable DCN identifier. As described with respect to request and/or notification module 124, the request and/or notification module 124 can store, in alarms database 125 association(s) of an addressable DCN identifier to function block identifier(s) and/or alarm configuration file(s) in response to an alarms configuration request, from a corresponding DCN, that includes the function block identifier(s). The push module 126 can identify an updated alarm configuration file in response to a notification from configuration module 122 or in response to recognizing an update in the alarms database 125. In response to identifying an updated alarm configuration file, the push module 126 can cause the updated alarm configuration file to be provided to the DCN that corresponds to the addressable DCN identifier associated with the updated alarm configuration file and/or its associated function block identifiers.

In some implementations, in causing an updated alarm configuration file to be provided to the DCN that corresponds to the addressable DCN identifier, the push module 126 can transmit the updated alarm configuration file to the DCN identifier and independent of any alarm configuration request from the DCN. In some implementations, in causing an updated alarm configuration file to be provided to the DCN that corresponds to the DCN identifier, the push module 126 can transmit, to the addressable DCN identifier, an update request that when received by the DCN, can be determined to be an alarm configuration condition. The DCN can thereafter, when deemed appropriate by the DCN, transmit an alarm configuration request. The alarm configuration request can be processed by the request and/or notification module 124, and the updated alarm configuration file transmitted, by the request and/or notification module 124 to the DCN, in response to the alarm configuration request. Implementations where the push module 126 provides the update request in lieu of the updated alarm configuration file enables the DCN, receiving the update request, to determine when it is appropriate to transmit an alarm configuration request and receive the updated alarm configuration file in response. Accordingly, the DCN can receive the update request and determine, locally, when to responsively transmit an alarm configuration request. For example, at a time of receiving the update request the DCN resources may be strained due to controlling of actuator(s) and/or an alarm engine of the DCN detecting current alarm condition(s) are satisfied. Based on one of both of these situations being present, the DCN can wait to issue the alarm configuration request when one or both of these situations is no longer present.

Alarm viewer 140 is illustrated as including a connection module 142. In some implementations, alarm viewer 140 is implemented within a process automation facility. In such an implementation, alarm viewer 140 may be implemented on one or more local computing systems, such as on one or more server computers. However, in some implementations some or all aspects of alarm viewer 140 can be implemented in computing system(s) that are remote from the process automation facility. In some of those implementations, the viewer 140 can be in communication with the process automation network 106 via a wide-area network.

Alarm viewer 140 can be in communication with alarm engine(s) of DCN(s) 110A-N via connection-oriented communication sessions. For example, in FIG. 1 alarm viewer 140 is in communication with alarm engines 116A, 116C, and 116N via respective of connection-oriented communication sessions 106A, 106B, and 106C. Connection module 142 can establish the connection-oriented communication sessions according to techniques disclosed herein. For example, connection module 142 can implement one or more blocks of method 400 (FIG. 4), 400A (FIG. 5), and/or 400B (FIG. 6).

Alarm viewer 140 can cause rendering, of at least any active alarm(s), via one or more output device(s) in response to an in accordance with alarm message(s) received via an alarm engine via a respective connection-oriented communication session. For example, the alarm viewer 140 can cause display of at least active alarm(s) via fixed display screen(s) in a process automation facility. The fixed display screen(s) can be communicatively coupled with the computing system(s) that implement the alarm viewer. Also, for example, the alarm viewer 140 can cause at least some active alarm(s) (e.g., those designated as "high priority" in corresponding alarm configuration file(s)) to be transmitted to mobile phone(s) of individual(s) e.g., as text message alerts or push notification(s) through an alarm application installed on the mobile phone(s). Such transmitting can be via the process automation network 106 and/or via one or more WANs connected to the process automation network. The rendering of an active alarm by alarm viewer 140 can optionally include audible and/or visual rendering of a descriptor or other message(s) that corresponds to the condition(s) that caused the alarm, such as a descriptor defined in the alarm configuration file for the alarm.

An active alarm can be signaled to the alarm viewer 140 based on a transmission from a DCN whose alarm engine determined occurrence of the active alarm. The transmission can include a message pertaining to the alarm e.g., a descriptor of the alarm as determined using an alarm configuration file, an identification of the function block and/or process variable(s) that resulted in the alarm, and/or an indication of the alarm configuration file. The alarm viewer 140, in rendering detail(s) on the alarm, can utilize information included in the transmission from the DCN and/or information that is derived, from the alarms database 125, utilizing information included in the transmission.

As described herein, to ensure low-latency rendering of alarms by the alarm viewer 140 and/or security of alarm viewer 140, connection-oriented communication sessions between the alarm viewer 140 and DCN(s) implementing alarm engine(s) can be desired. In some of those implementations, the alarm viewer 140 can utilize addressable DCN identifier(s), stored in alarms database 125 by request and/or notification module 124 and/or provided to the alarm viewer 140 in a push notification by request and/or notification module 124, in establishing such connection-oriented communication sessions. This can ensure that connection-oriented communication sessions are established between the alarm viewer 140 and corresponding DCN(s) and can overcome difficulties that arise with determining which DCN(s) implement alarm engine(s) in heterogeneous and/or distributed process automation systems.

FIG. 1 illustrates the example environment 100 at a first point in time, such as right after initial commissioning of the process automation system 108. In some implementations, during initial commissioning, one or more of the DCNs 110A-N can initially include locally stored function block(s) (and corresponding function block identifier(s)) and/or locally stored alarm engine(s) (and corresponding function block identifier(s)), but may not have any alarm configuration file(s) stored thereon. After connecting to process automation network 106, such one or more of the DCNs 110A-N can each transmit a corresponding alarm configuration request and, in response, obtain any responsive alarm configuration file(s) from alarm configuration service 120. Further, addressable DCN identifiers, obtained from the alarm configuration requests, can be provided to the alarm viewer 140 (directly or via the alarms database 125) to cause the alarm viewer 140 to establish connection-oriented communication sessions with the corresponding DCNs that implement alarm engines. For example, to establish connection-oriented communication sessions 106A, 106B, and 106C.

FIG. 2 illustrates the example environment 100 of FIG. 1, after the DCN 110A of FIG. 1 has been replaced with an alternate DCN 110A1. The alternate DCN 110A1 can replace DNC 110A due to, for example, failure of DCN 110A or the inability of the I/Os of DCN 110A to additionally connect sensor 115A (which is connected to 110A1 in FIG. 2). In FIG. 2, DCN 110A1 is coupled, via a first I/O, to the FT component 111A, is coupled, via a second I/O to the actuator 113A and is coupled, via a third I/O to the sensor 115A. DCN 110A1 includes processor(s) 112A1 that can utilize associated memory (and corresponding instructions stored therein) for implementing corresponding function(s) of the DCN 110A1. Those function(s) include implementing function block(s) 114A1 of DCN 110A1, which can be stored in some of the associated memory. Those function(s) also include implementing an alarm engine 116A1. In response to commissioning or being powered on, the DCN 110A1 can transmit an alarm configuration request that includes function block identifiers of the function block(s) 114A1 and/or of the function block(s) that are monitored by the alarm engine 116A1, which can include additional function block(s) relative to function block(s) 114A (FIG. 1).

The request and/or notification module 124 can, in response to the alarm configuration request, identify, from alarms database 125, the alarm configuration file(s) stored in association with the function block identifier(s) of the alarm configuration request. Further, the request and/or notification module 124 can transmit, to the DCN 110A1, the identified alarm configuration file(s), to cause implementation of the alarm configuration file(s) by the DCN 110A1. Yet further, the request and/or notification module 124 can update the alarms database 125 to store an association of an addressable DCN identifier, of DCN 110A1, with the alarm configuration file(s) and/or with the function block identifier(s) and/or can provide, to the alarm viewer 140, a push notification that includes the addressable DCN identifier of DCN 110A1. It is noted that the DCN identifier of DCN 110A1 can be unique relative to the DCN identifier of replaced DCN 110A. Updating the alarms database 125 to reflect the DCN identifier of DCN 110A1 and/or providing the push notification to the alarm viewer 140 can enable alarm viewer 140 to establish a connection-oriented communication session 106D with DCN 110A1 and/or can enable effective pushing, of updated alarm configuration file(s), by push module 126. Further, the unique DCN identifier of DCN 110A1 illustrates the robustness of including the function block identifier in the alarm configuration request, and the use thereof by request and/or notification module 124 in responding to the request and/or in enabling alarm viewer 140 to establish a connection-oriented communication session with DCN 110A1. For example, if some of the responsive alarm configuration files had instead been stored only in association with a DCN identifier of DCN 110A, and the DCN identifier of DCN 110A1 included in the request in lieu of the function block identifier(s), the request and/or notification module 124 would be unable to identify such alarm configuration file(s) in response to the alarm configuration request from DCN 110A1.

FIG. 3 illustrates the example environment 100 of FIG. 1, after DCN110A of FIG. 1 has been altered to remove the alarm engine 116A. As a result of the alarm engine 116A being removed, the directed communication session 110A (FIG. 1) between alarm viewer 140 and DCN 110A will no longer exist (i.e., since the session was with the alarm engine 116A). Further, the alarm engine 116C (FIG. 1) of DCN 110C has been altered so that it now also includes, in its alarm monitoring functionality, the alarm monitoring functionality that was implemented by the alarm engine 116A (removed from the first DCN 110A). In response to detecting an alarm configuration condition, DCN 110C can transmit an alarm configuration request that includes function block identifiers of the function blocks that are monitored by the alarm engine 116C1, which can include those that were previously monitored by alarm engine 116A (FIG. 1).

The request and/or notification module 124 can, in response to the alarm configuration request, identify, from alarms database 125, the alarm configuration files stored in association with the function block identifiers of the alarm configuration request. Further, the request and/or notification module 124 can transmit, to the DCN 110C, the identified alarm configuration files, to cause implementation of the alarm configuration files by the DCN 110C. Yet further, the request and/or notification module 124 can optionally update the alarms database 125 to store an association of a DCN identifier, of DCN 110C, with the alarm configuration files and/or with the function block identifiers.

FIG. 4 is a flowchart illustrating an example method 400 of using an addressable DCN identifier, received in an alarm configuration transmission from the DCN, to establish a persistent connection-oriented communication session between an alarm viewer and an alarm engine of the DCN. For convenience, the operations of the flow chart are described with reference to a system that performs the operations. This system may include various components of various computer systems, such as alarm configuration service 120 (e.g., request and/or notification module 124) and/or alarm viewer 140. Moreover, while operations of method 400 are shown in a particular order, this is not meant to be limiting. One or more operations may be reordered, omitted or added.

At block 402, the system receives, via a process automation network and from a DCN, an alarm configuration transmission that includes an addressable DCN identifier. In some implementations, block 402 includes sub-block 403A or sub-block 403B.

At sub-block 403A, the alarm configuration transmission is an alarm configuration request that also includes function block identifier(s). The DCN can include the function block identifier(s) in the alarm configuration request based on the corresponding function block(s) being executed by the DCN and/or being assigned for use in alarm monitoring by the DCN. Further, and as described herein (e.g., method 700 of FIG. 7), an alarm configuration service can respond to the alarm configuration request by transmitting, to the DCN, alarm configuration file(s) in response to determining that each of the alarm configuration file(s) is assigned to a corresponding one of the function block identifier(s) of the alarm configuration request At sub-block 403B, the alarm configuration transmission is an alarm configuration notification. The alarm configuration notification can optionally include function block identifier(s) and can specify corresponding alarm configuration file(s) that were pre-loaded on the DCN and/or created locally at the DCN (e.g., via a direct connection with a human machine interface (HMI)). Further, and as described herein, an alarm configuration service that receives the alarm configuration notification to update an alarms database to reflect, for example, association(s) of the alarm configuration file(s) to the function block(s).

At block 404, the system determines whether there is already an established connection-oriented communication session between an alarm viewer and the DCN. If so, the system proceeds to block 410 and the current iteration of method 400 ends. If not, the system proceeds to block 406.

At block 406, the system uses the addressable DCN identifier, from the alarm configuration transmission of block 402, to establish a persistent connection-oriented communication session between an alarm viewer and an alarm engine of the DCN. For example, the alarm viewer can initiate establishing of a TCP connection or other persistent connection-oriented communication session, and it can be established with an OPC-UA server that implements the alarm engine on the DCN. In some implementations, the addressable DCN identifier includes an IP address of the DCN and a port and the alarm viewer establishes the persistent connection-oriented communication session using the IP address and the port. The port can be, for example, a port used by the alarm engine of the DCN. For instance, it can be a port used by an OPC-UA server that implements the alarm engine on the DCN.

At block 408, the system causes rendering of alarm message(s) that are transmitted, by the alarm engine of the DCN, using the established persistent connection-oriented communication session. For example, the alarm engine of the DCN can detect alarm condition(s) based on local alarm monitoring and transmit, using the established persistent connection-oriented communication session, the alarm messages to the alarm viewer. The alarm viewer can receive the alarm messages and cause rendering thereof.

Figure 5:
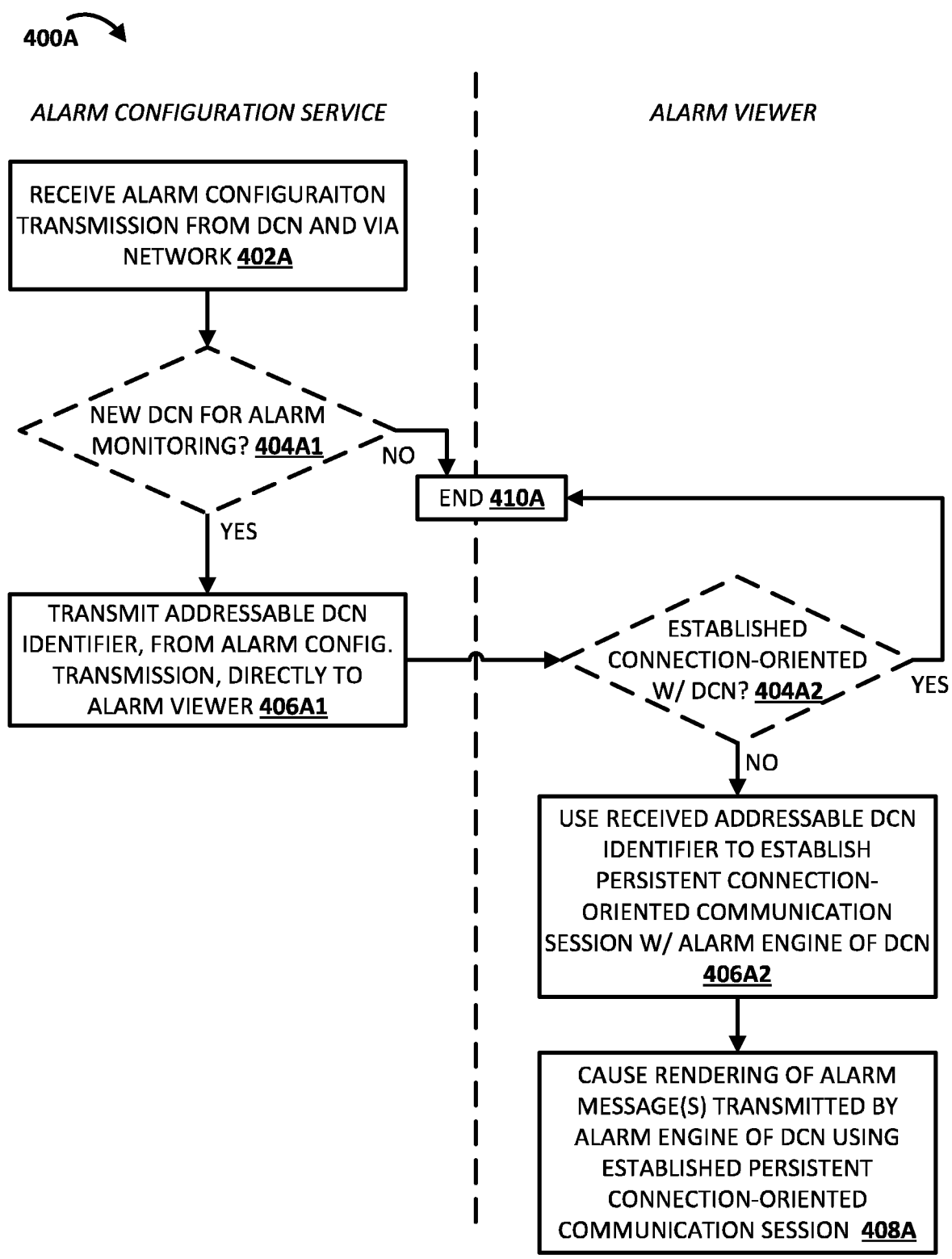
FIG. 5 illustrates one particular implementation of the example method of FIG. 4.

FIG. 5 illustrates one particular implementation 400A of the example method 400 of FIG. 4. In FIG. 5, blocks illustrated on the left side of the dashed line and under "alarm configuration service" indicate blocks that can be performed, in the particular implementation 400A, by an alarm configuration service such as alarm configuration service 120 (FIGS. 1-3). Further, blocks illustrated on the right side of the dashed line and under "alarm viewer"

indicate blocks that can be performed, in the particular implementation 400A, by an alarm viewer such as alarm viewer 140 (FIGS. 1-3).

At block 402A, an alarm configuration service receives an alarm configuration transmission from a DCN and via a process automation network.

At optional block 404A1, the alarm configuration service determines whether the DCN, that sent the alarm configuration transmission received at block 402A, is a new DCN for alarm monitoring. If so, the alarm configuration service proceeds to block 406A1. If not, the alarm configuration service proceeds to block 410A and the current iteration of implementation 400A ends. In some implementations, at block 404A1 the alarm configuration service can access an alarms database that it manages to determine whether there are any existing entries for the addressable DCN identifier, of the DCN, included in the alarm configuration transmission. If so, it can determine the DCN is not a new DCN for alarm monitoring. If not, it can determine the DCN is a new DCN for alarm monitoring. In some implementations, at block 404A1 the alarm configuration service can poll the alarm viewer to determine whether it has an existing connection-oriented communication session established with the addressable DCN identifier. If so, it can determine the DCN identifier is not a new DCN identifier for alarm monitoring. If not, it can determine the DCN identifier is a new DCN identifier for alarm monitoring.

At block 406A1, the alarm configuration service transmits the addressable DCN identifier, from the alarm configuration transmission, directly to the alarm viewer.

At optional block 404A2, the alarm viewer determines, in response to receiving the addressable DCN identifier transmitted at block 406A1, whether the alarm viewer already has an established connection-oriented communication session with the addressable DCN identifier. If so, the alarm viewer proceeds to block 410A and the current iteration of implementation 400A ends. If not, the alarm viewer proceeds to block 406A2.

At block 406A2, the alarm viewer uses the received addressable DCN identifier (transmitted at block 406A1) to establish a persistent connection-oriented communication session with an alarm engine of the DCN corresponding to the addressable DCN identifier.

At block 408A, the system causes rendering of alarm message(s) that are transmitted by the alarm engine of the DCN using the established persistent connection-oriented communication session.

FIG. 6 illustrates another particular implementation of the example method of FIG. 4. Like FIG. 5, in FIG. 6 blocks illustrated on the left side of the dashed line and under "alarm configuration service" indicate blocks that can be performed, in the particular implementation 400A, by an alarm configuration service such as alarm configuration service 120 (FIGS. 1-3). Further, blocks illustrated on the right side of the dashed line and under "alarm viewer" indicate blocks that can be performed, in the particular implementation 400A, by an alarm viewer such as alarm viewer 140 (FIGS. 1-3).

At block 402B, an alarm configuration service receives an alarm configuration transmission from a DCN and via a process automation network.

At block 404B1, the alarm configuration service determines whether the alarm configuration transmission, of block 402B, is one that necessitates a new association, in an alarms database that it manages, of data from the alarm configuration transmission to an addressable DCN identifier of the transmission. If so, the alarm configuration service proceeds to block 406B1. If not, the alarm configuration service proceeds to block 410B and the current iteration of implementation 400A ends. In some implementations, at block 404B1 the alarm configuration service can access the alarms database to determine whether there are existing entries for an association of data from the alarm configuration transmission to the addressable DCN identifier of the transmission. If so, it can determine the alarm configuration transmission, of block 402B, is not one that necessitates a new association in the database. If not, it can determine the alarm configuration transmission, of block 402B, is one that necessitates a new association in the database.

At block 406B1, the alarm configuration service generates, in the alarms database, a new association of data from the alarm configuration transmission to an addressable DCN identifier of the transmission. For example, the new association can be an association of function blocks(s), from the alarm configuration transmission, to the DCN identifier of the transmission and/or an association of alarm configuration file(s) (e.g., from the alarm configuration transmission), to the DCN identifier of the transmission.

At block 404B2, the alarm viewer determines whether there is a new addressable DCN identifier, in the alarms database, with which the alarm viewer has not yet established a connection-oriented communication session. If not, the alarm viewer can repeat block 404B2, optionally after a regular or irregular delay. If so, the system proceeds to block 406B2.

At block 406B2, the system uses the new addressable DCN identifier, from the alarms database, to establish a persistent connection-oriented communication session with an alarm engine of the DCN corresponding to the new addressable DCN identifier. The system can also return to block 404B2 and continue to monitor for another new a new addressable DCN identifier, in the alarms database, with which the alarm viewer has not yet established a connection-oriented communication session.

At block 408B, the system causes rendering of alarm message(s) that are transmitted by the alarm engine of the DCN using the established persistent connection-oriented communication session.

FIG. 7 is a flowchart illustrating an example method 700 of storing alarm configuration files in association with function block identifiers, and transmitting an alarm configuration file in response to an alarm configuration request that includes the function block identifier associated with the alarm configuration file. For convenience, the operations of the flow chart are described with reference to a system that performs the operations. This system may include various components of various computer systems, such as alarm configuration service 120. Moreover, while operations of method 700 are shown in a particular order, this is not meant to be limiting. One or more operations may be reordered, omitted or added.

At block 702, the system receives alarm configuration files and their associated function block identifiers. Block 702 can optionally include sub-block 702A and/or sub-block 702B. At sub-block 702A, the system receives at least some of the alarm configuration files and their associated function block identifiers via a bulk upload. At sub-block 702B, the system receives at least some of the alarm configuration files and their associated function block identifiers via interactions of user(s) with an alarm configuration GUI, such as alarm configuration GUI 130.

At block 704, the system stores, in an alarms database, the alarm configuration files received at block 702 and stores, in the alarms database, each of the alarm configuration files in association with a corresponding function block identifier.

At block 706, the system receives, from a DCN and via a process automation network, an alarm configuration request that includes a particular function block identifier, an addressable DCN identifier (of the DCN) and, optionally, additional function block identifier(s). The DCN can include, in the alarm configuration request, the function block identifier(s) based on them being executed by the DCN and/or being monitored by an alarm engine of the DCN.

At block 708, the system retrieves, from the alarms database, an alarm configuration file. The system retrieves the alarm configuration file based on it being stored in association with the function block identifier of the request of block 708. At block 708, the system can also optionally retrieve additional alarm configuration file(s) based on them being stored in association with additional function block identifier(s) of the request of block 708. In various implementations, one or more of the retrieved alarm configuration file(s) can be unique relative to all other alarm configuration files in the database and/or provided to other DCNs in response to other alarm configuration requests. For example, one or more of the retrieved alarm configuration file(s) can have unique condition(s) and/or variable(s), or a unique combination of condition(s) and variable(s), relative to all other alarm configuration files provided to other DCNs in response to other alarm configuration requests.

At block 710, the system transmits, to the DCN, the alarm configuration file retrieved at block 708 and optionally any additional alarm configuration file(s) retrieved at block 708. The system transmits the alarm configuration file(s) in response to the alarm configuration request and via the process automation network.

At optional block 712, the system stores, in the alarm database and in association with the retrieved alarm configuration file and/or the function block identifier of the request, an addressable DCN identifier associated with the alarm configuration request. The system can also store the addressable DCN identifier in association with any additional retrieved alarm configuration file(s) and/or additional function block identifier(s) of the request. The addressable DCN identifier is an identifier of the DCN that transmitted the alarm configuration request. The DCN identifier can be included in the body of the alarm configuration request, or can be determined from e.g., a transmission header associated with the request. As described herein, in various implementations, when the DCN identifier is stored in association with the alarm configuration file in the database, the DCN identifier can thereafter be utilized by e.g. alarm viewer 140 in establishing a connection-oriented communication session with the corresponding DCN. This can enable low-latency and/or secure transmission of alarm data from the corresponding DCN to the alarm viewer 170. In these and other manners, secure and/or prompt rendering of alarms via the alarm viewer can be provided. Further, this is enabled without requiring manual assigning of DCN identifier(s) with which the alarm viewer should establish connection-oriented communication session(s). As also described herein, in various implementations the DCN identifier can additionally or alternatively be included in a push notification that is transmitted to the alarm viewer 140 and utilized by the alarm viewer 140 in establishing a connection-oriented communication session with the corresponding DCN.

At block 714, the system awaits an additional alarm configuration request from another DCN. If one is received, the system proceeds back to block 706 and processes the additional alarm configuration request. Although illustrated in a serial manner in method 700, it is noted that multiple alarm configuration requests can be processed in parallel in various implementations.

FIG. 8 is a flowchart illustrating an example method 800 of generating and transmitting an alarm configuration request, receiving an alarm configuration file in response, and implementing local alarm monitoring based on the received alarm configuration file. For convenience, the operations of the flow chart are described with reference to a system that performs the operations. This system may include various components of various computer systems, such as any one of DCNs 110A-N. Moreover, while operations of method 800 are shown in a particular order, this is not meant to be limiting. One or more operations may be reordered, omitted or added.

At block 802, the system monitors for occurrence of an alarm configuration condition. If an alarm configuration condition is detected at block 802, the system proceeds to block 804. In some implementations, at block 802 the system monitors for occurrence of any one of multiple conditions, such as determining it is newly commissioned, determining it has been powered up, determining that its alarm engine is assigned to monitor function block(s) but that monitoring not being currently active, determining that is has been more than a threshold duration of time since it last issued an alarm configuration request, and/or receiving an update request from an alarm configuration service (e.g., from push module 126).

At block 804, the system generates an alarm configuration request that includes a function block identifier, of a function block, based on the function block being locally executed and/or being locally utilized in alarm monitoring. For example, the system can include the function block identifier based on it being assigned for use by an alarm engine, of the system, in alarm monitoring. In some implementations, the alarm configuration request includes multiple function block identifiers, of multiple function blocks, based on them each being locally executed and/or being locally utilized in alarm monitoring. The alarm configuration request can also include an addressable DCN identifier of the DCN that generates and transmits the alarm configuration request.

At block 806, the system transmits the alarm configuration request, generated at block 804, via a process automation network.

At block 808, the system receives, via the process automation network and in response to the request, an alarm configuration file for the function block identifier. At block 808, the system can optionally receive multiple alarm configuration files when, for example, the alarm configuration request includes multiple function block identifiers. In some implementations, the alarm configuration file(s) are received, at block 808, responsive to block 710, of method 700 of FIG. 7, being performed.

At block 809, the system determines whether all of the received alarm configuration files are duplicates. That is, whether all of the received alarm configuration files are already locally stored and being locally utilized by the alarm engine of the system in performing alarm monitoring. If so, the system proceeds back to block 802 and monitors for occurrence of another alarm configuration condition. If not, the system proceeds to block 810.

At block 810, the system implements local alarm monitoring based on the received alarm configuration file (if not a duplicate) and the function block, and based on any additional received alarm configuration file(s) (if not duplicate(s) and corresponding function block(s).

Block 810 can optionally include sub-block 810A. At sub-block 810A, in implementing local alarm monitoring based on the receive alarm configuration file and the function block, the system monitors the function block (e.g., during execution of the function block) for satisfaction of condition(s) of the alarm configuration file and, in response to detecting satisfaction of the condition(s), perform(s) corresponding action(s) for the satisfied condition(s), such as transmitting corresponding data to an alarm viewer.

Figure 9:
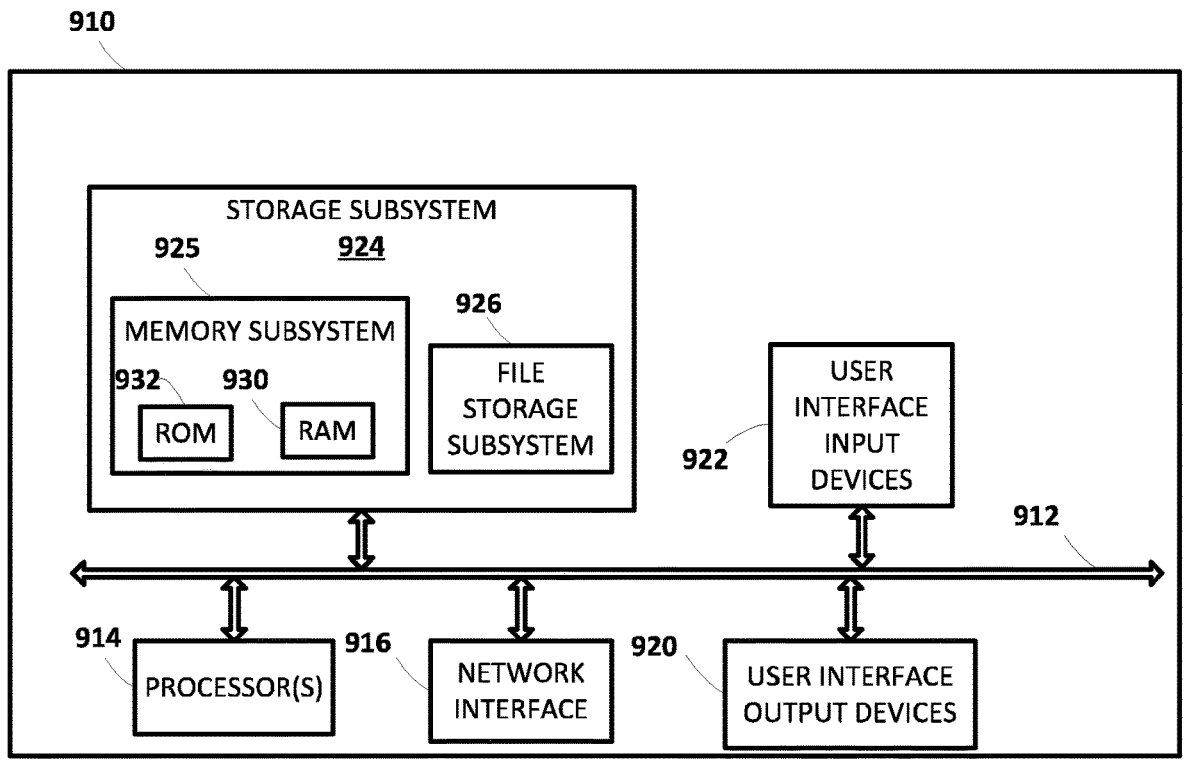
FIG. 9 schematically illustrates an example computer architecture on which selected aspects of the present disclosure can be implemented.

FIG. 9 is a block diagram of an example computing device 910 that may optionally be utilized to perform one or more aspects of techniques described herein. For example, computing device 910 is an example of a computing device that can implement all or parts of alarm configuration service and/or, optionally, all or parts of some DCN(s). Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods of FIGS. 4-8, as well as to implement various components depicted in FIGS. 1-3.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by hardware processor(s) is provided and includes receiving, via a network of a process automation system, an alarm configuration transmission from a distributed control node (DCN) of the process automation system. When the transmission is received, the DCN lacks any established communication session with an alarm viewer application of the process automation system. Further, the alarm configuration transmission indicates that the DCN is implementing alarm monitoring that is based on one or more function blocks of the process automation system, and includes a network addressable DCN identifier of the DCN. The method further includes, in response to receiving the alarm configuration transmission, providing the network addressable DCN identifier to the alarm viewer application. Providing the network addressable DCN identifier to the alarm viewer application causes the alarm viewer application to: establish, via the network and using the network addressable DCN identifier, a persistent connection-oriented communication session with an alarm engine of the DCN, and cause rendering of alarm messages transmitted by the alarm engine of the DCN using the persistent connection-oriented communication session.

These and other implementations of the technology disclosed herein can include one or more of the following features.

In some implementations, the persistent connection-oriented communication session with the DCN is established utilizing Transmission Control Protocol (TCP).

In some implementations, the network addressable DCN identifier includes an Internet Protocol (IP) address, and the alarm viewer application utilizes the IP address in establishing the persistent connection-oriented communication session with the DCN. In some of those implementations, the network addressable DCN identifier further includes a port, and the alarm viewer application utilizes the port in establishing the persistent connection-oriented communication session with the alarm engine of the DCN.

In some implementations, the alarm configuration transmission is an alarm configuration request that includes the function block identifier, and the DCN includes the function block identifier in the alarm configuration request based on the function block being assigned for use in alarm monitoring by the DCN. In some versions of those implementations, the method further includes transmitting, via the network of the process automation system and to the DCN, an alarm configuration file responsive to the alarm configuration file being stored in an alarms database in association with the function block identifier and the function block identifier being included in the received alarm configuration request. In those versions, the DCN lacked the alarm configuration file prior to transmitting of the alarm configuration file to the DCN.

In some implementations, the alarm configuration transmission is an alarm configuration notification that includes an alarm configuration file, and the alarm configuration notification is transmitted by the DCN in response to the alarm configuration file being pre-loaded on the DCN or being configured via a direct connection with the DCN.

In some implementations, providing the network addressable DCN identifier to the alarm viewer application includes transmitting, to the alarm viewer application via the network, a push notification that includes the network addressable DCN identifier. In some of those implementations, the method further includes determining that the DCN lacks any established communication session with the alarm viewer application, and transmitting, to the alarm viewer application via the network, the push notification, is further in response to determining that the DCN lacks any established communication session with the alarm viewer application.

In some implementations, providing the network addressable DCN identifier to the alarm viewer application includes storing, in an alarms database, an association of the network addressable DCN identifier to one or more alarm configuration files, and the alarm viewer application monitors the alarms database for new network addressable DCN identifiers.

In some implementations, a method implemented by hardware processor(s) is provided and includes receiving, via a network of a process automation system, an alarm configuration transmission that: is transmitted by a distributed control node (DCN) of the process automation system; includes a network addressable DCN identifier of the DCN; and includes a function block identifier of a function block, based on the function block being assigned for use in alarm monitoring by an alarm engine of the DCN. The method further includes, in response to receiving the alarm configuration transmission and determining that no connection-oriented communication session between an alarm viewer and an alarm engine of the DCN is established: establishing, via the network and by the alarm viewer using the network addressable DCN identifier, a persistent connection-oriented communication session with the alarm engine of the DCN. The method further includes, subsequent to establishing the persistent connection-oriented communication session with the alarm engine of the DCN: causing, by the alarm viewer, an alarm message to be rendered in response to the alarm message being transmitted to the alarm viewer by the alarm engine of DCN using the persistent connection-oriented communication session.

These and other implementations of the technology disclosed herein can include one or more of the following features.

In some implementations, the network addressable DCN identifier includes an Internet Protocol (IP) address, and the alarm viewer application utilizes the IP address in establishing the persistent connection-oriented communication session with the DCN.

In some implementations, the network addressable DCN identifier further includes a port of a server, on the DCN, that implements the alarm engine, and the alarm viewer application utilizes the port in establishing the persistent connection-oriented communication session with the alarm engine of the DCN.

In some implementations, the alarm configuration transmission is an alarm configuration request and the method further includes: transmitting, via the network of the process automation system and to the DCN, an alarm configuration file responsive to the alarm configuration file being stored in an alarms database in association with the function block identifier and the function block identifier being included in the received alarm configuration request. In those implementations, the DCN lacked the alarm configuration file prior to transmitting of the alarm configuration file to the DCN.

In some implementations, the alarm configuration transmission is an alarm configuration notification that includes an alarm configuration file, and the alarm configuration notification is transmitted by the DCN in response to the alarm configuration file being pre-loaded on the DCN or being configured via a direct connection with the DCN.

In some implementations, a process automation system is provided that includes an alarms database that includes: multiple function block specific alarm configuration files and, for each of the function block specific alarm configuration files, a corresponding association to a corresponding function block identifier; and one or more alarm configuration processors. The alarm configuration processor(s) execute stored instructions to: receive, via the network, an alarm configuration request that is transmitted by a node of the process automation system and that includes: a network addressable identifier of the node, and a function block identifier of a function block. The alarm configuration request includes the function block identifier based on the function block being assigned for use in alarm monitoring by the node. In executing the stored instructions, the alarm configuration processor(s) are further to, responsive to receiving the alarm configuration request, provide the network addressable identifier to an alarm viewer application of the process automation system. Providing the network addressable identifier to the alarm viewer application causes the alarm viewer application to: establish, via the network and using the network addressable identifier, a persistent connection-oriented communication session with an alarm engine of the node, and cause rendering of alarm messages transmitted by the alarm engine of the node using the persistent connection-oriented communication session.

These and other implementations of the technology disclosed herein can include one or more of the following features.

In some implementations, the system further includes one or more alarm viewer processors implementing the alarm viewer application. In some versions of those implementations, the one or more alarm viewer processors execute stored alarm viewer instructions to: determine that the network addressable identifier was provided by the one or more alarm configuration processors; and in response to determining that the network addressable DCN identifier was provided by the one or more alarm configuration processors: establish, via the network and using the network addressable DCN identifier, the persistent connection-oriented communication session with the alarm engine of the DCN. In some of those versions, in determining that the network addressable DCN identifier was provided by the one or more alarm configuration processors, one or more of the alarm viewer processors are to: monitor an alarms database for occurrence of any network addressable DCN identifiers with which the alarm viewer has not established any connection-oriented communication session; and determine that the network addressable DCN identifier was provided by the one or more alarm configuration processors in response to identifying, during the monitoring, the network addressable DCN identifier, as one with which the alarm viewer has not established a connection-oriented communication session. Optionally, the system further includes the node and the node can optionally be a distributed control node (DCN) that executes the function block.

What is claimed is:

1. A method implemented by one or more processors, the method comprising:
   receiving, via a network of a process automation system, an alarm configuration transmission from a distributed control node (DCN) of the process automation system, wherein, when the transmission is received, the DCN lacks any established communication session with an alarm viewer application of the process automation system, and
   wherein the alarm configuration transmission indicates that the DCN is implementing alarm monitoring that is based on one or more function blocks of the process automation system, and includes a network addressable DCN identifier of the DCN;
   in response to receiving the alarm configuration transmission:
   providing the network addressable DCN identifier to the alarm viewer application;
   wherein providing the network addressable DCN identifier to the alarm viewer application causes the alarm viewer application to:
      establish, via the network and using the network addressable DCN identifier, a persistent connection-oriented communication session with an alarm engine of the DCN, and
      cause rendering of alarm messages transmitted by the alarm engine of the DCN using the persistent connection-oriented communication session.

2. The method of claim 1, wherein the persistent connection-oriented communication session with the DCN is established utilizing Transmission Control Protocol (TCP).

3. The method of claim 1, wherein the network addressable DCN identifier includes an Internet Protocol (IP) address, and the alarm viewer application utilizes the IP address in establishing the persistent connection-oriented communication session with the DCN.

4. The method of claim 3, wherein the network addressable DCN identifier further includes a port, and the alarm viewer application utilizes the port in establishing the persistent connection-oriented communication session with the alarm engine of the DCN.

5. The method of claim 1, wherein the alarm configuration transmission is an alarm configuration request that includes the function block identifier, and wherein the DCN includes the function block identifier in the alarm configuration request based on the function block being assigned for use in alarm monitoring by the DCN.

6. The method of claim 5, further comprising:

transmitting, via the network of the process automation system and to the DCN, an alarm configuration file responsive to the alarm configuration file being stored in an alarms database in association with the function block identifier and the function block identifier being included in the received alarm configuration request, wherein the DCN lacked the alarm configuration file prior to transmitting of the alarm configuration file to the DCN.

7. The method of claim 1, wherein the alarm configuration transmission is an alarm configuration notification that includes an alarm configuration file, and wherein the alarm configuration notification is transmitted by the DCN in response to the alarm configuration file being pre-loaded on the DCN or being configured via a direct connection with the DCN.

8. The method of claim 1, wherein providing the network addressable DCN identifier to the alarm viewer application comprises transmitting, to the alarm viewer application via the network, a push notification that includes the network addressable DCN identifier.

9. The method of claim 8, further comprising:

determining that the DCN lacks any established communication session with the alarm viewer application;

wherein transmitting, to the alarm viewer application via the network, the push notification, is further in response to determining that the DCN lacks any established communication session with the alarm viewer application.

10. The method of claim 1, wherein providing the network addressable DCN identifier to the alarm viewer application comprises storing, in an alarms database, an association of the network addressable DCN identifier to one or more alarm configuration files and wherein the alarm viewer application monitors the alarms database for new network addressable DCN identifiers.

11. A method implemented by one or more processors, the method comprising:

receiving, via a network of a process automation system, an alarm configuration transmission that:

is transmitted by a distributed control node (DCN) of the process automation system, includes a network addressable DCN identifier of the DCN, and includes a function block identifier of a function block, based on the function block being assigned for use in alarm monitoring by an alarm engine of the DCN;

in response to receiving the alarm configuration transmission and determining that no connection-oriented communication session between an alarm viewer and an alarm engine of the DCN is established:

establishing, via the network and by the alarm viewer using the network addressable DCN identifier, a persistent connection-oriented communication session with the alarm engine of the DCN;

subsequent to establishing the persistent connection-oriented communication session with the alarm engine of the DCN:

causing, by the alarm viewer, an alarm message to be rendered in response to the alarm message being transmitted to the alarm viewer by the alarm engine of DCN using the persistent connection-oriented communication session.

12. The method of claim 11, wherein the network addressable DCN identifier includes an Internet Protocol (IP) address, and the alarm viewer application utilizes the IP address in establishing the persistent connection-oriented communication session with the DCN.

13. The method of claim 12, wherein the network addressable DCN identifier further includes a port of a server, on the DCN, that implements the alarm engine, and the alarm viewer application utilizes the port in establishing the persistent connection-oriented communication session with the alarm engine of the DCN.

14. The method of claim 11, wherein the alarm configuration transmission is an alarm configuration request and further comprising:

transmitting, via the network of the process automation system and to the DCN, an alarm configuration file responsive to the alarm configuration file being stored in an alarms database in association with the function block identifier and the function block identifier being included in the received alarm configuration request, wherein the DCN lacked the alarm configuration file prior to transmitting of the alarm configuration file to the DCN.

15. The method of claim 11, wherein the alarm configuration transmission is an alarm configuration notification that includes an alarm configuration file, and wherein the alarm configuration notification is transmitted by the DCN in response to the alarm configuration file being pre-loaded on the DCN or being configured via a direct connection with the DCN.

16. A process automation system, comprising:

an alarms database that includes multiple function block specific alarm configuration files and, for each of the function block specific alarm configuration files, a corresponding association to a corresponding function block identifier;

one or more alarm configuration processors executing stored instructions to:

receive, via the network, an alarm configuration request transmitted by a node of the process automation system, wherein the alarm configuration request includes:

a network addressable identifier of the node, and a function block identifier of a function block, and includes the function block identifier based on the function block being assigned for use in alarm monitoring by the node;

responsive to receiving the alarm configuration request:

provide the network addressable identifier to an alarm viewer application of the process automation system;

wherein providing the network addressable identifier to the alarm viewer application causes the alarm viewer application to:

establish, via the network and using the network addressable identifier, a persistent connection-oriented communication session with an alarm engine of the node, and cause rendering of alarm messages transmitted by the alarm engine of the node using the persistent connection-oriented communication session.

17. The process automation system of claim 16, further comprising:

one or more alarm viewer processors implementing the alarm viewer application.

18. The process automation system of claim 17, wherein the one or more alarm viewer processors execute stored alarm viewer instructions to:

determine that the network addressable identifier was provided by the one or more alarm configuration processors; and in response to determining that the network addressable DCN identifier was provided by the one or more alarm configuration processors:

establish, via the network and using the network addressable DCN identifier, the persistent connection-oriented communication session with the alarm engine of the DCN.

19. The process automation system of claim 18, wherein in determining that the network addressable DCN identifier was provided by the one or more alarm configuration processors, one or more of the alarm viewer processors are to:

monitor an alarms database for occurrence of any network addressable DCN identifiers with which the alarm viewer has not established any connection-oriented communication session; and determine that the network addressable DCN identifier was provided by the one or more alarm configuration processors in response to identifying, during the monitoring, the network addressable DCN identifier, as one with which the alarm viewer has not established a connection-oriented communication session.

20. The process automation system of claim 19, further comprising the node, and wherein the node is a distributed control node (DCN) that executes the function block.

* * * * *